United States Patent
Arriola-Bengoa Unzueta et al.

(10) Patent No.: US 11,391,459 B2
(45) Date of Patent: Jul. 19, 2022

(54) REGULATING VALVE FOR A GAS COOKING APPLIANCE, AND GAS COOKING APPLIANCE INCORPORATING SAID REGULATING VALVE

(71) Applicant: COPRECI, S.COOP., Aretxabaleta (ES)

(72) Inventors: Imanol Arriola-Bengoa Unzueta, Erentxun (ES); Félix Querejeta Andueza, Hendaye (FR); Iñaki Ayastuy Aretxaga, Bergara (ES)

(73) Assignee: COPRECI, S.COOP., Aretxabaleta (ES)

( * ) Notice: Subject to any disclaimer, the term of this patent is extended or adjusted under 35 U.S.C. 154(b) by 65 days.

(21) Appl. No.: 17/101,868

(22) Filed: Nov. 23, 2020

(65) Prior Publication Data

US 2021/0164657 A1    Jun. 3, 2021

(30) Foreign Application Priority Data

Nov. 29, 2019 (EP) .................................. 19383066

(51) Int. Cl.
*F16K 3/08* (2006.01)
*F23N 1/00* (2006.01)
*F23K 5/14* (2006.01)

(52) U.S. Cl.
CPC .............. *F23N 1/007* (2013.01); *F16K 3/085* (2013.01); *F23K 5/147* (2013.01);
(Continued)

(58) Field of Classification Search
CPC .. F23N 1/007; F23N 2235/16; F23N 2235/24; F23N 2241/08; F16K 3/085;
(Continued)

(56) References Cited

U.S. PATENT DOCUMENTS 4,328,832 A     5/1982  Inada
4,410,001 A  * 10/1983  Goguen ............... A01G 25/162
                                                        137/625.46
(Continued)

FOREIGN PATENT DOCUMENTS

CN    207229799 U   4/2018
EP      2299156 A2  3/2011
WO   2018216044 A1  11/2018

OTHER PUBLICATIONS

Extened European Search Report received in EP application No. 20382040.2, dated Jul. 20, 2020 (6 pages).

*Primary Examiner* — Kelsey E Cary
(74) *Attorney, Agent, or Firm* — Edell, Shapiro & Finnan, LLC

(57) ABSTRACT

A regulating valve with at least one gas outlet conduit and a housing having at least one outlet hole in fluid communication with the outlet conduit; a rotating disc arranged in the housing; a spring axially retaining the rotating disc in the housing; and sealing means surrounding the at least one outlet hole. The sealing means includes a gasket having a closure member associated with each outlet hole, surrounding the same, and at least one attachment arm attached to the at least one closure member. The attachment arm including at least one protuberance, with the rotating disc being supported on the closure members and on the protuberances when it presses on the gasket.

20 Claims, 18 Drawing Sheets

(52) U.S. Cl.
CPC .............. *F23K 2900/05002* (2013.01); *F23N 2235/16* (2020.01); *F23N 2235/24* (2020.01); *F23N 2241/08* (2020.01)

(58) Field of Classification Search
CPC ..... F16K 3/06; F16K 3/10; F16K 5/10; F16K 5/103; F16K 5/106; F23K 5/147; F23K 2900/05002
USPC .................................................. 251/206, 207
See application file for complete search history.

(56) References Cited

U.S. PATENT DOCUMENTS

| | | | | |
|---|---|---|---|---|
| 4,610,268 | A * | 9/1986 | Knapp | ................ F16K 11/0787 137/454.6 |
| 4,643,215 | A * | 2/1987 | Phlipot | ..................... F16K 3/08 29/890.128 |
| 5,806,552 | A * | 9/1998 | Martin, Jr. | .......... F16K 11/0782 137/270 |
| 7,261,117 | B2 * | 8/2007 | Mork | ................. F16K 11/0743 137/625.41 |
| 2005/0092377 | A1 | 5/2005 | Mork | |
| 2010/0122742 | A1 | 5/2010 | Lin | |
| 2018/0045172 | A1 * | 2/2018 | Bucher | ................ F01B 3/0002 |
| 2021/0080123 | A1 * | 3/2021 | Metker | ................ F16K 31/535 |

* cited by examiner

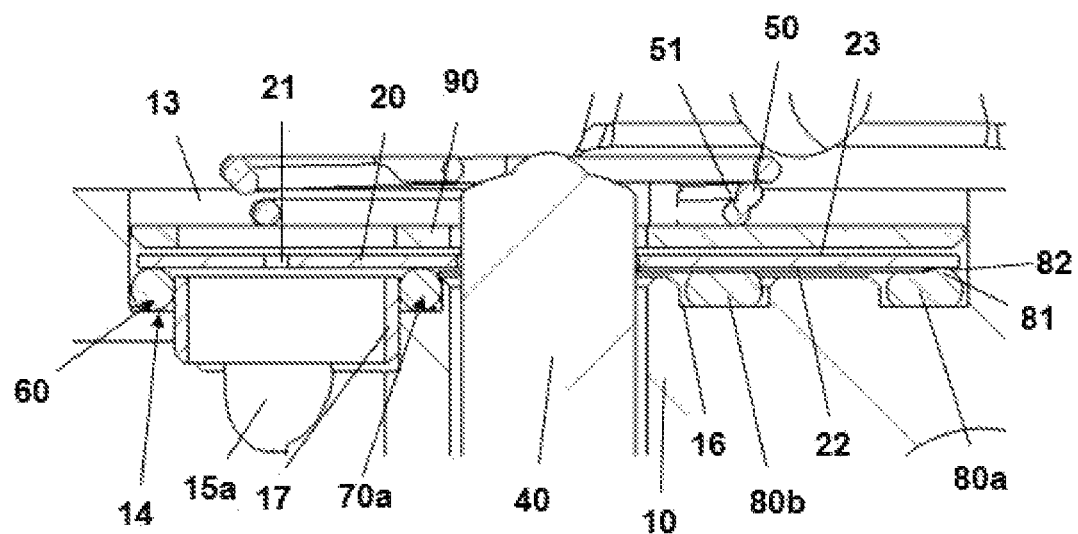
FIG. 3
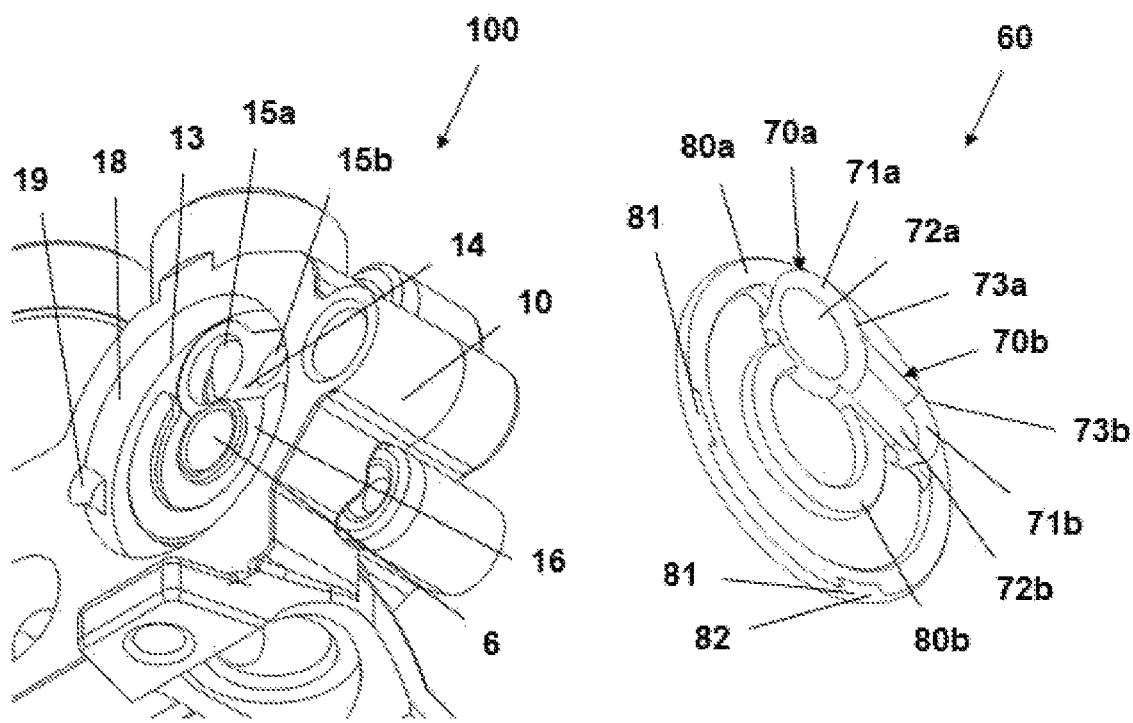
FIG. 4
FIG. 5

REGULATING VALVE FOR A GAS COOKING APPLIANCE, AND GAS COOKING APPLIANCE INCORPORATING SAID REGULATING VALVE

CROSS-REFERENCE TO RELATED APPLICATIONS

This application relates to and claims the benefit and priority to European Application No. EP19383066.8, filed Nov. 29, 2019.

TECHNICAL FIELD

The present invention relates to regulating valves for a gas cooking appliance and to gas cooking appliances incorporating said regulating valves.

BACKGROUND

Regulating valves for a gas cooking appliance are known.

Document EP2299156A2 describes a regulating valve for a gas cooking appliance, comprising a valve body comprising an inlet conduit through which gas is supplied, a gas outlet conduit, and a housing in fluid communication with the inlet conduit and the outlet conduit; a rotating disc arranged in the housing of the valve body on a contact surface of the housing, the contact surface comprising an outlet hole in fluid communication with the outlet conduit, the rotating disc being suitable for rotating with respect to the contact surface and for regulating gas flow between the housing and the outlet conduit by means of the rotation of the rotating disc; a spring assembly which pushes the rotating disc and retains it axially at one end against the contact surface; and a gasket arranged such that it is housed on the contact surface surrounding the outlet hole, the rotating disc being supported pressing on the gasket. To improve sealing, the spring assembly is arranged on the gasket, the spring assembly comprising a disc tensioning device and a helical spring.

WO2018/216044A1 describes a regulating valve for a gas cooking appliance, comprising a valve body comprising an inlet conduit through which gas is supplied, a gas outlet conduit, and a housing in fluid communication with the inlet conduit and the outlet conduit; a rotating disc arranged in the housing of the valve body on a contact surface of the housing, the contact surface comprising an outlet hole in fluid communication with the outlet conduit, the rotating disc being suitable for rotating with respect to the contact surface and for regulating gas flow between the housing and the outlet conduit by means of the rotation of the rotating disc; a spring which pushes the rotating disc and retains it axially at one end against the contact surface; and a gasket arranged such that it is housed on the contact surface surrounding the outlet hole, the rotating disc being supported pressing on the gasket. The gasket of the regulating valve occupies the entire space of the contact surface of the housing of the body of the valve, except for the openings corresponding to the outlet holes of the corresponding gas, with the rotating disc being supported on the surface of the gasket.

SUMMARY

Disclosed is a regulating valve for a gas cooking appliance, and a gas cooking appliance incorporating said regulating valve.

According to one embodiment, the regulating valve includes a valve body comprising an inlet conduit through which gas is supplied, at least one gas outlet conduit, and a housing in fluid communication with the inlet conduit and the outlet conduit; a rotating disc arranged in the housing of the valve body on a contact surface of the housing, the contact surface comprising at least one outlet hole in fluid communication with the outlet conduit, the rotating disc being suitable for rotating with respect to the contact surface and for regulating gas flow between the housing and the outlet conduit by means of the rotation of the rotating disc; at least one spring which pushes the rotating disc and retains it axially at one end against the contact surface; and sealing means housed on the contact surface surrounding the outlet hole, the rotating disc being supported pressing on the gasket.

The sealing means includes a gasket comprising a closure member associated with each outlet hole, the closure member comprising a body with an opening surrounding the corresponding outlet hole, and at least one attachment arm attached to the closure member, the at least one attachment arm comprising at least one protuberance, with the rotating disc being supported on the closure members and on the protuberances when it presses on the gasket.

In the regulating valves of the prior art, in order to assure sealing between the rotating disc and the outlet hole, particularly when the regulating valve is in the closed position, the pressure exerted by the spring on the rotating disc in the region above the gasket in the closure contour of the gas outlet hole is increased with devices comprising pressure discs and springs, thereby increasing valve complexity and cost. Alternatively, the surface of the gasket also increases, occupying the entire space of the contact surface of the housing of the body of the valve where the rotating disc is arranged, except for the openings corresponding to the outlet holes, with the rotating disc being supported on the surface of the gasket, requiring in these cases a spring with a greater strength to obtain suitable pressure on the gasket, given that the surface of the gasket has increased considerably, thereby making the regulating valve more expensive.

In the gasket of the regulating valve, since the rotating disc is supported pressing on the gasket, only on the closure member surrounding the gas outlet hole and on the protuberances of the attachment arms, the pressure on the gasket in the closure contour of the outlet hole increases, given that the support surface of the rotating disc on the gasket has decreased considerably. This allows the pressure for supporting the rotating disc on the gasket to increase for one and the same spring, thereby obviating the need for tensioning discs with specific additional springs, and assuring the sealing of the regulating valve in any rotation position of the rotating disc, and particularly in the closed position of the regulating valve. Also for one and the same pressure as the one used in the prior art on the gasket, a spring with a lower strength, and therefore a lower cost, can be used. It also allows reducing the surface of the gasket, given that the gasket of the regulating valve of comprises at least one attachment arm attached to the closure member, instead of occupying the entire space of the contact surface of the housing of the body of the regulating valve, whereby a reduction in the cost of the gasket, and therefore of the regulating valve, is also obtained.

Other advantages of the regulating valve are that with the support surface of the gasket formed by the closure member and the protuberance of the attachment arm, equilibrium is maintained in the support of the rotating disc on the gasket, and furthermore the contact surface between the rotating disc and the gasket is minimized, such that when the rotating disc is rotated for regulating gas flow to the gas outlet conduit, friction, and therefore abrasion, between the rotating disc and the gasket is minimized, obtaining a longer service life of the gasket.

These and other advantages and features will become evident in view of the drawings and detailed description.

BRIEF DESCRIPTION OF THE DRAWINGS

FIG. 3 shows a detailed section view of the housing of the body of the regulating valve with the gasket of FIG. 1.

FIG. 4 shows a detailed perspective view of the housing of the body of the regulating valve of FIG. 1.

FIG. 5 shows a perspective view of the gasket of the regulating valve of FIG. 1.

DETAILED DESCRIPTION

Figure 1:
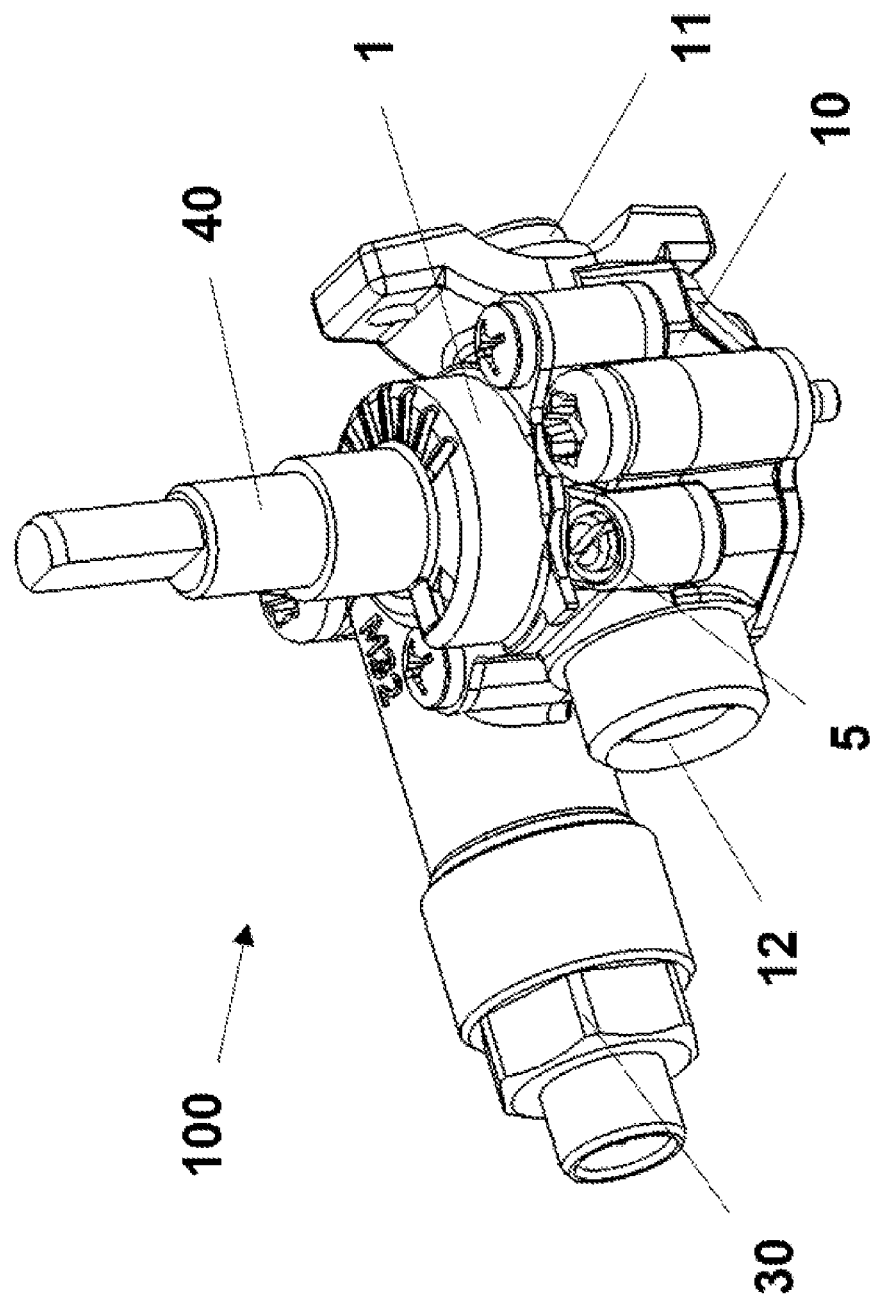
FIG. 1 shows a perspective view of an embodiment of a regulating valve with a safety valve, a gas outlet conduit, and a bypass.
Figure 2:
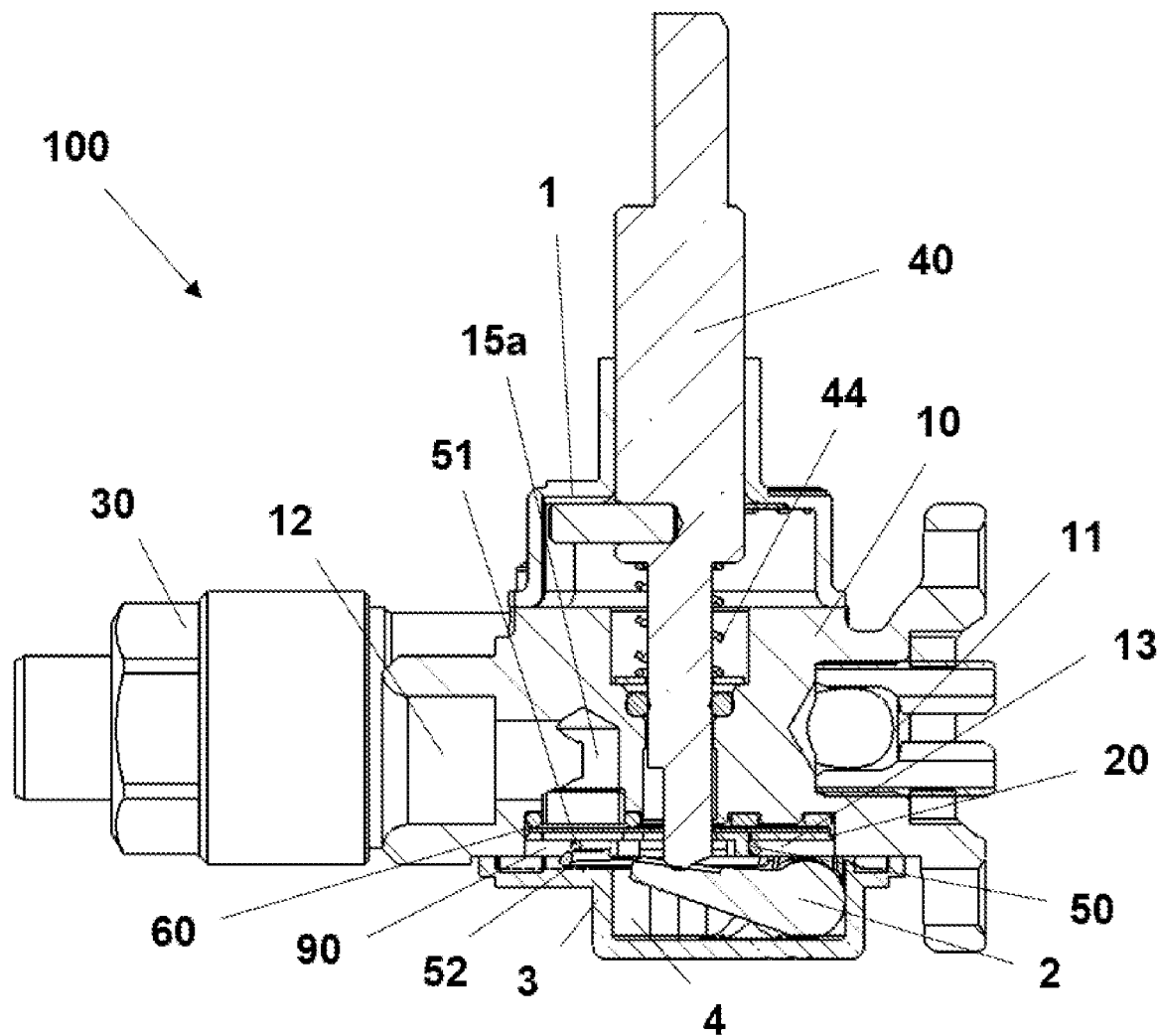
FIG. 2 shows a vertical longitudinal section view of the regulating valve of FIG. 1.
Figure 6:
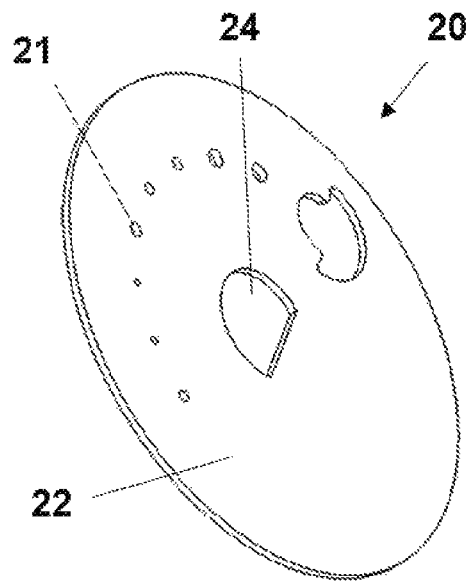
FIG. 6 shows a perspective view of the rotating disc of the regulating valve of FIG. 1.

FIGS. 1 to 9B show an embodiment of a regulating valve 100 for a gas cooking appliance. The regulating valve including a safety valve 30, a gas outlet conduit 12, and a minimum gas flow calibration bypass for changing the type of gas, which can be regulated from the outside of the regulating valve 100 by regulating means 5.

The regulating valve 100 comprises a valve body 10 comprising a gas inlet conduit 11 through which gas is supplied, a gas outlet conduit 12 suitable for conducting incoming gas to a burner (not shown in the drawings), and a housing 13 of the valve body 10 in fluid communication with the inlet conduit 11 and the outlet conduit 12. The regulating valve 100 also comprises a rotating disc 20 arranged in the housing 13 of the valve body 10 on a contact surface 14 of the housing 13, the contact surface 14 comprising two outlet holes 15a and 15b in fluid communication with the outlet conduit 12, the rotating disc 20 being suitable for rotating with respect to the contact surface 14 and for regulating gas flow between the housing 13 and the outlet conduit 12 by means of the rotation of the rotating disc 20. The regulating valve 100 also comprises a spring 50 which pushes the rotating disc 20 and retains it axially against the contact surface 14, and sealing means comprising a gasket 60 housed on the contact surface 14, which is surrounding the outlet holes 15a and 15b, the rotating disc 20 being supported pressing on the gasket 60.

The gasket 60 includes two closure members 70a and 70b associated respectively with each outlet hole 15a and 15b, each closure member 70a and 70b comprising a respective body 71a and 71b surrounding the outlet hole 15a and 15b, each body 71a and 71b comprising respectively a respective opening 72a and 72b which allows the passage of gas flow to the outlet holes 15a and 15b. The gasket 60 also comprises two attachment arms 80a and 80b attaching the two closure members 70a and 70b, the radius of attachment arm 80a being greater than the radius of attachment arm 80b. The attachment arm 80a includes two protuberances 81, such that the rotating disc 20 is supported on a support surface 73a and 73b, respectively, of the bodies 71a and 71b of the closure members 70a and 70b, arranged in the upper part of the bodies 71a and 71b, and on an upper surface 82 of the protuberances 81, pressing on the gasket 60.

In this manner, the gasket 60 in this embodiment of the regulating valve 100 has a circular shape, with the two attachment arms 80a and 80b surrounding the center of the gasket 60. In this embodiment of the regulating valve 100, the attachment arm 80a extends radially to the edge of the contact surface 14 in the housing 13, such that it confers stability to the seating of the gasket 60 in the housing 13 of the valve body 100. In turn, the attachment arm 80b closely surrounds the drive shaft 40, the combination of the attachment arms 80*a* and 80*b* improving the stability of the gasket 60. The protuberances 81 are arranged on the surface of the attachment arm 80*a* which contacts the rotating disc 20, and radially arranged on the outer edge of the surface, the protuberances 81 being distributed in an approximate angle of 120° with respect to one another, with a center in the center of the gasket 60.

In this manner, the pressure on the gasket 60 in the closure contour of the outlet holes 15*a* and 15*b* increases, given that the support surface of the rotating disc 20 on the gasket 60 has decreased considerably with respect to the regulating valves comprising a gasket which occupies the entire contact surface of the housing of the body of the valve, given that the rotating disc 20 is only supported on the closure members 70*a* and 70*b* of the gasket 60 and on the two protuberances 81 of the attachment arm 80*a*. This allows, using the same spring as in a regulating valve of the prior art, with the same dimensional and gas flow characteristics, an increase in the pressure for supporting the rotating disc on the gasket, since the rotating disc is supported on a smaller surface of the gasket. Therefore, the size of the spring, and therefore the strength of the spring, can be reduced, in addition to being able to use a gasket having a smaller surface, and therefore a lower cost.

Furthermore, with respect to the regulating valves of the prior art which comprise tensioning discs with specific additional springs arranged on the rotating disc, in the support region on the gasket corresponding to the outlet hole, at least the tensioning disc can be eliminated due to the greater pressure exerted on the gasket, the overall cost being lower, despite the size of the gasket increasing to a certain extent.

The solution defined in the regulating valve of the invention allows assuring the sealing of the regulating valve in any position of rotation of the rotating disc, and particularly in the closed position of the regulating valve, due to the increase in pressure exerted on the gasket for the same size of spring used as in the prior art.

The gas inlet conduit 11 of the regulating valve 100 is in fluid communication with the safety valve 30, the rotating disc 20 being arranged in the housing 13 of the valve body 10, which is in turn in fluid communication with the safety valve 30 and the outlet conduit 12. In this embodiment of the regulating valve 100, the housing 13 of the valve body 10 is open to the outside. The regulating valve 100 comprises a closure cover 3 which is attached to the valve body 10 and closes the housing 13 in a leak-tight manner. The gasket 60 is first arranged in the housing 13 on the contact surface 14 of the housing 13, and a face 22 of the rotating disc 20 is then arranged supported on the gasket 60. The spring 50 which pushes the rotating disc 20 and retains it axially against the contact surface 14 is then arranged such that it is supported thereon, pressing on the gasket 60. The spring 50 is operatively supported at one end 51 on a face 23 of the rotating disc 20, opposite to the face 22, and at a second end 52, opposite to the end 51, is supported on the closure cover 3.

The regulating valve 100 also comprises a drive shaft 40 coupled at a lower end to the rotating disc 20 in a D-shaped hole 24 of the rotating disc 20, and comprises another upper end to which there is coupled a handle (not depicted) that can be operated by the user. The drive shaft 40 can rotate between an initial position of rotation and a final position of rotation, and can also be moved axially to act on a transmission element 2 for opening the safety valve 30. The transmission element 2 is housed in a housing of the cover 4, which forms the closure cover 3 with the housing 13 of the valve body 10. The transmission element 2 acts on the safety valve 30 in the housing of the cover 4. This housing of the cover 4 is in fluid communication with a hole (not shown in the drawings) which is arranged in the valve body 10. This hole is in fluid communication with the safety valve 30. In this embodiment, the transmission element 2 is a rocker arm, and the safety valve 30 comprises a shutter closing it, such that when the drive shaft 40 is pushed axially, the lower end coupled to the rotating disc 20 pushes the transmission element 2, and this transmission element 2 acts on the shutter of the safety valve 30 through the hole of the valve body 10, opening the safety valve 30. The incoming gas from the inlet conduit 11 can therefore pass through the safety valve 30, and through the open shutter, to the housing of the cover 3, occupying the housing 13 of the valve body 10 where the rotating disc 20 is arranged.

In this embodiment, the rotating disc 20 comprises a connection opening 21 comprising a plurality of through holes for regulating gas flow from the housing 13 of the valve body 10 to the outlet conduit 12 depending on the angular position thereof. The through holes of the connection opening 21 form a radially-shaped row, such that in order to obtain the required gas flow rate in the gas outlet conduit 12, a specific number of holes of the connection opening 21 of the rotating disc 20 are overlapped with the outlet hole 15*a* and/or the outlet hole 15*b* which is a minimum gas flow hole. Gas flow is varied by means of the holes of the connection opening 21 getting in and out of overlap with the outlet holes 15*a* and 15*b*.

The lower end of the drive shaft 40 is coupled to the rotating disc 20 in the coupling hole 24, the coupling hole 24 allowing the axial movement of the drive shaft 40 without axially moving the rotating disc 20. In turn, the gasket 60 allows the passage of the lower end of the drive shaft 40 through the space left by the attachment arm 80*b* around the center of the gasket 60. Finally, the lower end of the drive shaft 40 is housed in a housing 6 comprised in the valve body 10 on the contact surface 14 of the housing 13.

The regulating valve 100 comprises a spring 44 which is supported at one end on a rib of the drive shaft 40 and operatively supported at a second end on the valve body 10, the function of the spring 44 being to return the drive shaft 40 to a standby position when the drive shaft 40 is no longer axially pushed to open the safety valve 30. The regulating valve 100 comprises a cover 1 which has the drive shaft 40 going through same and closes a cavity formed between the cover 1 and the valve body 10, with the spring 44 being arranged in the cavity. The cover 1 of the regulating valve 100 comprises on the side arranged in the cavity of the spring 44 a plurality of concatenated housings, and the drive shaft 40 comprises a pin 41 arranged in an orthogonal manner with respect to the drive shaft 40, the pin 41 being pushed against the housings of the cover 1 by the action of the spring 44. In this manner, when the drive shaft 40 is rotated and arranged in the range of angular positions defining a gas flow of the regulating valve 100, it defines discrete positions of different gas flows in the gas regulating valve, which are distinguished by the user acoustically and/or sensorially.

The contact surface 14 on which the rotating disc 20 is located comprises the minimum hole 15*b* which is in fluid communication with a corresponding gas minimum conduit (not shown in the drawings). This gas minimum conduit is in fluid communication with the gas outlet conduit 12. The minimum gas flow of the regulating valve 100 is regulated by rotating the rotating disc 20 and overlapping a specific number of the through holes of the connection opening 21 with the minimum hole 15*b* in a specific angular position of the rotating disc 20. In this embodiment, the regulating valve 100 comprises, as shown in FIG. 1, regulating means 5 suitable for regulating the minimum gas flow rate. In this embodiment of the regulating valve 100, the regulating means 5 is a screw comprising a calibrated hole defining the minimum gas flow rate to be regulated in the regulating valve 100. The regulating means 5 are arranged in a conduit going through the gas minimum conduit, the conduit of the regulating means 5 being accessible from the outside of the regulating valve 100. With the help of a tool, it can be rotated such that the regulating means 5 move axially, which thereby allows regulating the passage of a different minimum gas flow rate depending on the position thereof. The minimum gas flow rate in the regulating valve 100 is regulated with greater precision with the help of the regulating means 5.

In this embodiment of the regulating valve 100, the protuberances 81 project from the surface of the attachment arm 80a towards the rotating disc 20 with a semi-cylindrical shape arranged on the outer edge of the surface, and defining a curved outer surface which thereby presents a minimum contact, and therefore friction, surface with the face 22 of the rotating disc 20 when the rotating disc 20 rotates as a result of the action of the drive shaft 40, and when the rotating disc 20 is supported on the protuberances 81 of the attachment arm 80a, pressing on the gasket 60.

In turn, the attachment arms 80a and 80b of the gasket 60 have a quadrangular-shaped cross-section, allowing a uniform and extended contact with the contact surface 14 of the housing 13 of the valve body 10, such that it leads to very stable seating of the gasket 60 in the regulating valve 100, despite the thrust performed by the rotating disc 20 during rotation thereof due to the action of the drive shaft 40.

In turn, the respective body 71a and 71b of the closure members 70a and 70b of the gasket 60 has a circular cross-section, the closure members 70a and 70b being configured as oblong-shaped O-rings fitting and surrounding the respective outlet holes 15a and 15b. Like in the protuberances 81, the O-rings define a curved outer surface which thereby presents a small, and therefore lower-friction, contact surface with the face 22 of the rotating disc 20 when the rotating disc 20 rotates as a result of the action of the drive shaft 40, and when the rotating disc 20 is supported on the bodies 71a and 71b of the closure members 70a and 70b, pressing on the gasket 60.

The contact surface 14 of the housing 13 of the valve body 10 comprises, as shown in FIG. 4, a planar support surface on which there is constructed, machined thereon, a channel 16 comprising different branches or arms extending over the contact surface 14 with the shape of the gasket 60, the attachment arms 80a and 80b and the closure members 70a and 70b of the gasket 60 being housed in the arms of the channel 16. The gasket 60 is housed in the channel 16, such that each attachment arm 80a and 80b and each closure member 70a and 70b are locked in the channel 16 in the walls forming each arm of the channel 16, the gasket 60 being pressed into the channel 16 as result of the support of the rotating disc 20. This housing of the gasket 60 also allows assuring the stability of the gasket 60, given that each attachment arm 80a and 80b is housed in branches of the channel 16 with side walls, but each radially opposite segment of the attachment arms 80a and 80b also abuts opposite walls of the channel 16 which keep the attachment arms 80a and 80b immobile when the rotating disc 20 is rotated.

Figure 9A:
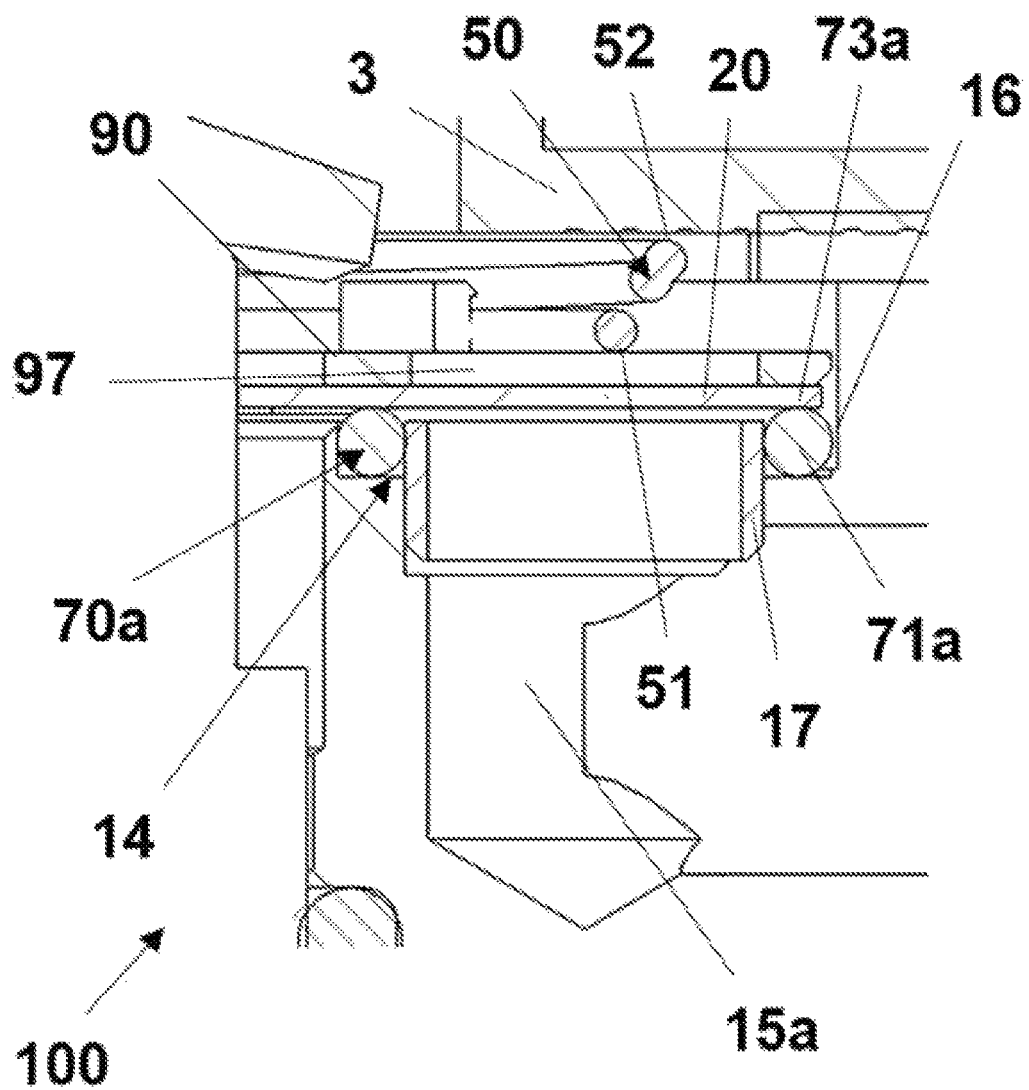
FIG. 9A shows a detailed section view of the housing of the body of the regulating valve of FIG. 1, with a closure member of the gasket arranged surrounding an outlet hole, the regulating valve being in a closed gas flow position.
Figure 9B:
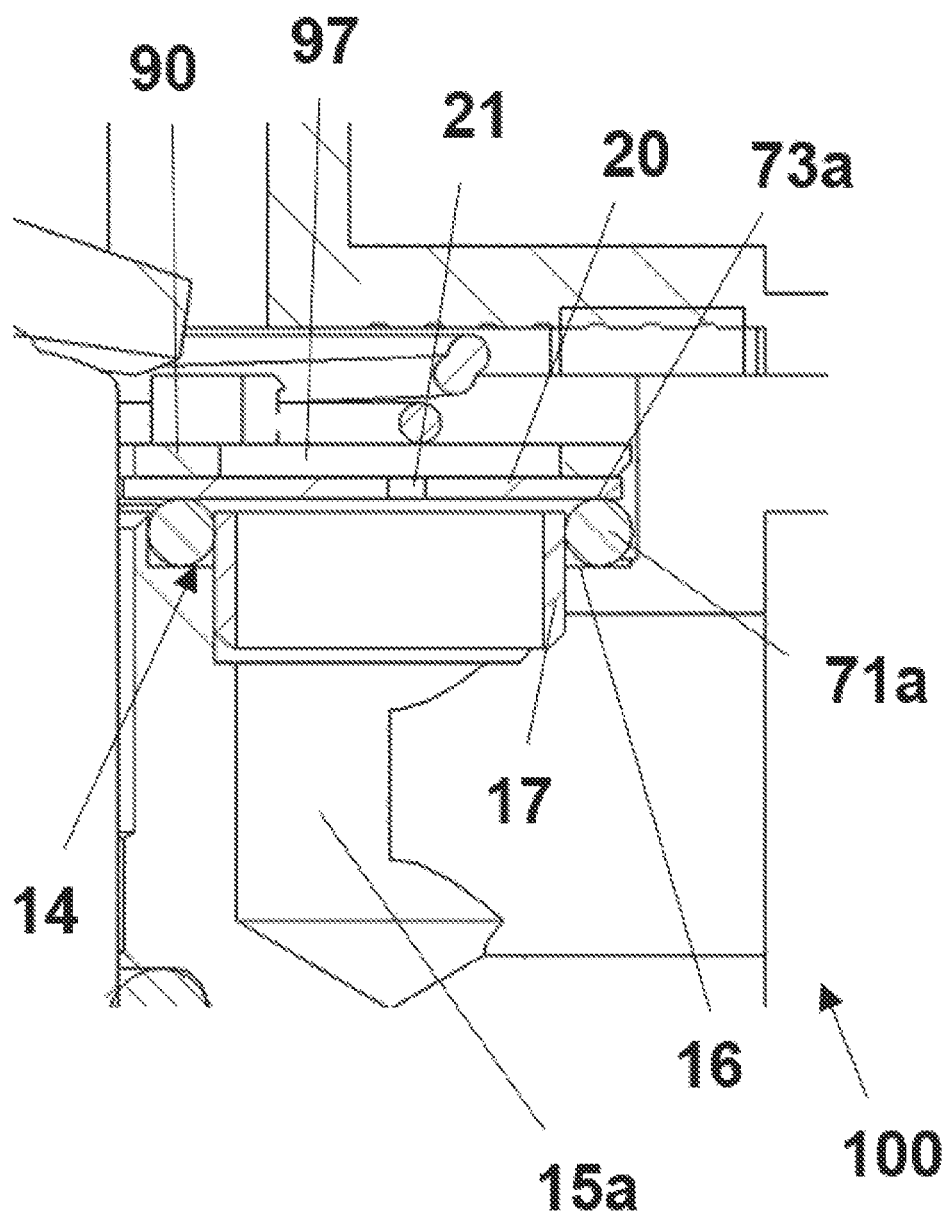
FIG. 9B shows a detailed section view of the housing of the body of the regulating valve of FIG. 1, with a closure member of the gasket arranged surrounding an outlet hole, the regulating valve being in an open gas flow position.
Figure 10:
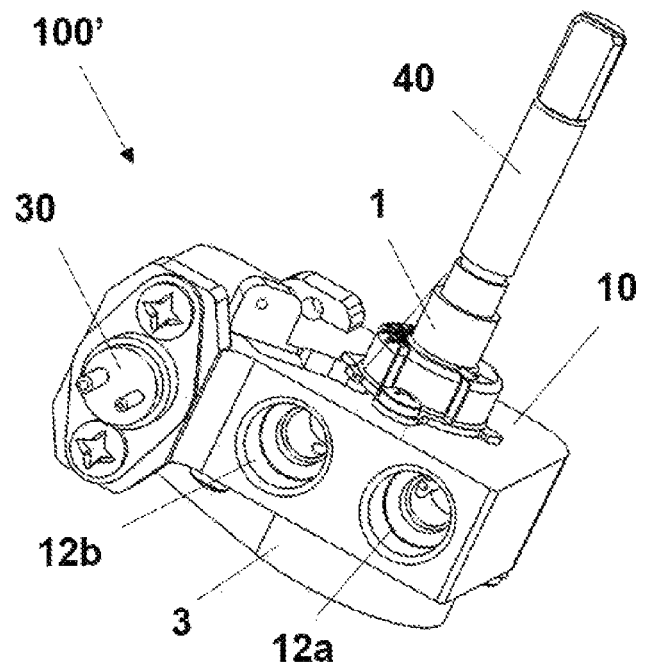
FIG. 10 shows a perspective view of a second embodiment of a regulating valve with a safety valve and two gas outlet conduits.
Figure 11:
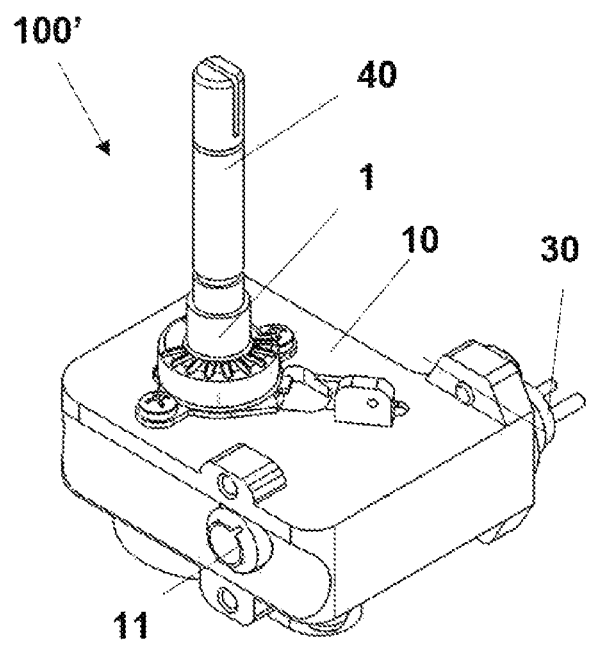
FIG. 11 shows another perspective view of the regulating valve of FIG. 10.
Figure 12:
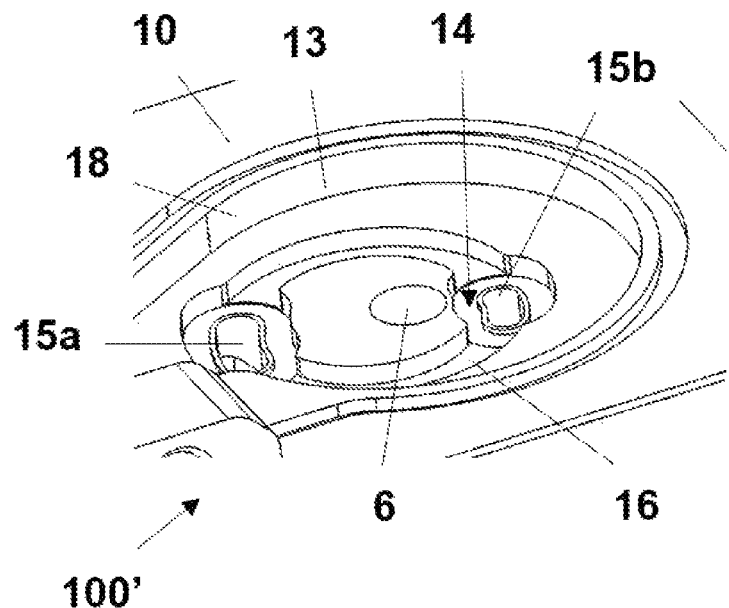
FIG. 12 shows a detailed perspective view of the housing of the body of the regulating valve of FIG. 10.

To further assure sealing in the outlet hole 15a of the main gas flow of the regulating valve 100, and to improve gasket stability in the region of the closure members 70a and 70b of the gasket 60, the regulating valve 100 comprises, as shown in FIGS. 3, 9A, and 9B, a plastic bushing 17 arranged such that it is introduced in the outlet hole 15a. The bushing 17 is partially introduced in the outlet hole 15a, with an end of the bushing 17 being supported on an inner seating of the valve body 10 inside the outlet hole 15a, and a segment of the bushing 17 projecting out of the outlet hole 15a, such that the body 71a of the closure member 70a of the gasket 60 is housed in the corresponding branch of the channel 16, laterally abutting the wall of the channel 16 itself and the projecting segment of the bushing 17. The body 71a is therefore immobilized in the channel 16, and the pressure of the rotating disc 20 on the body 71a is applied more effectively.

Figure 7:
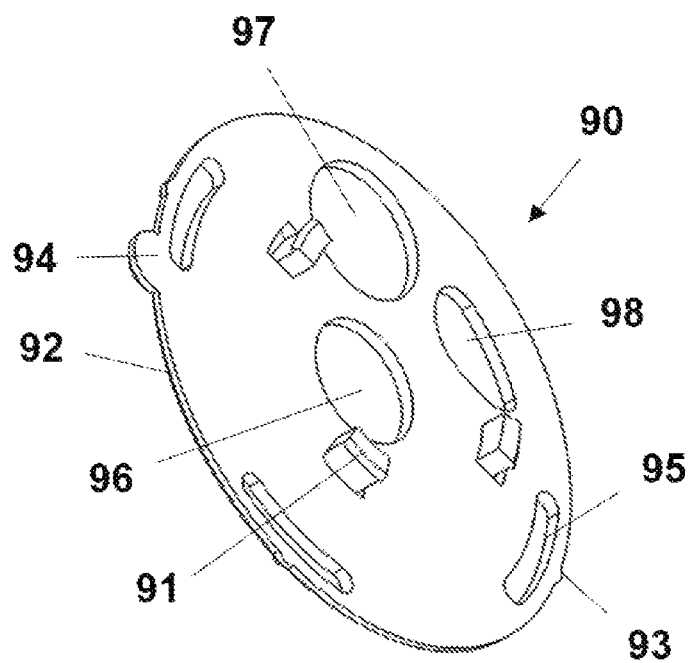
FIG. 7 shows a perspective view of the pushing plate of the regulating valve of FIG. 1.

In this embodiment and as shown in FIG. 7, the regulating valve 100 also comprises a pushing plate 90 which is supported on the rotating disc 20 occupying the entire surface thereof, the end 51 of the spring 50 which pushes the rotating disc 20 being supported on one face of the pushing plate 90, and the other face of the pushing plate 90 being supported on the face 23 of the rotating disc 20. In this embodiment of the regulating valve 100, the spring 50 is a constant load spring, given that the axis of axial movement of the drive shaft 40 does not affect the axial movement of the rotating disc 20, and therefore does not affect the spring 50. This spring 50 keeps its pressure on the rotating disc 20 constant, and does not rotate when the rotating disc 20 is angularly shifted.

The pushing plate 90 comprises a plurality of tabs 91, specifically three in this embodiment, which allow coupling the end 51 of the spring 50 to the pushing plate 90, being clipped to the tabs 91. The tabs 91 are arranged forming a circle the center of which does not coincide with the center of the pushing plate 90 which is in the center of a hole 96 allowing the passage of the drive shaft 40, the function of this off-centering is defined below.

In this embodiment of the regulating valve 100, the pushing plate 90 has a circular shape, like the rotating disc 20 and the contact surface 14 of the housing 13. The pushing plate 90 comprises along the circular perimeter of the edge 92 a plurality of protrusions 93, specifically three in this embodiment, distributed on the edge 92 every 120°. The pushing plate 90 also comprises, arranged on the edge 92, a semicircular-shaped orienting protrusion 94. For its part, the housing 13 of the valve body 10 comprises a circular side wall 18 bordering the contact surface 14, the wall 18 comprising a semi-cylindrical-shaped housing 19 (see FIG. 4) which houses the orienting protrusion 94 of the pushing plate 90 when the pushing plate 90 is assembled on the rotating disc 20 in the housing 13. The pushing plate 90 is thereby immobilized in the housing 13.

When the assembly is performed, the protrusions 93 of the pushing plate 90 are arranged pressing on the side wall 18, such that it makes it difficult for the pushing plate 90 to move out of the housing 13 and of its position on the rotating disc 20, particularly for operations of assembling the regulating valve 100. To improve the ease of assembly and the useful life of the pushing plate 90, the pushing plate 90 comprises a plurality of through openings 95, specifically three in this embodiment, arranged inside the pushing plate 90 confronted in association with each of the protrusions 93. The pressure exerted by the side wall 18 of the housing 13 on the protrusions 93 of the pushing plate 90 is therefore absorbed by the flexible openings 95. The pushing plate 90 also comprises two through holes 97 and 98 which provide passage, respectively, to the gas flow from the housing 13 to the outlet holes 15a and 15b through the connection opening 21 of the rotating disc 20.

Figure 8:
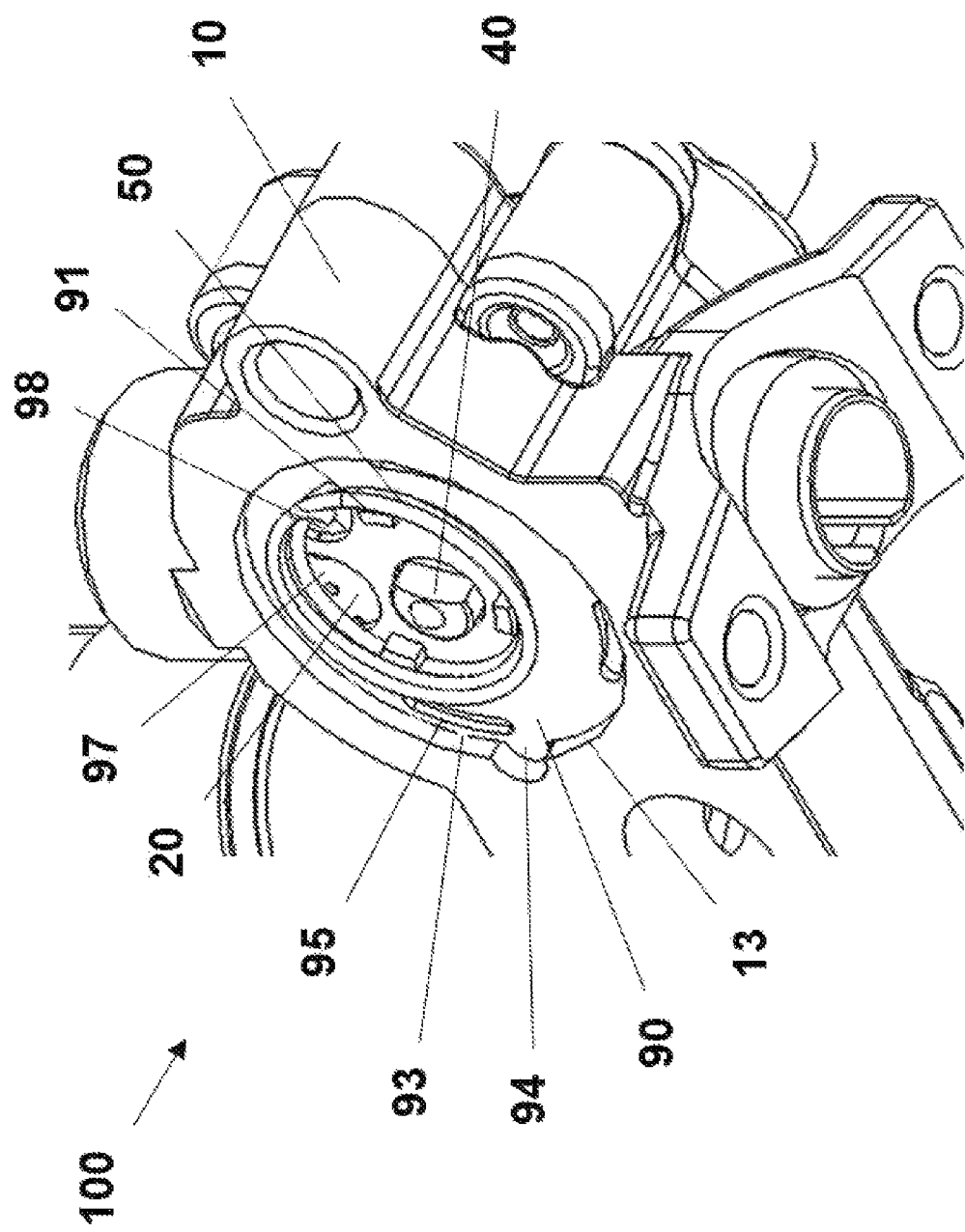
FIG. 8 shows a detailed perspective view of the housing of the body of the regulating valve of FIG. 1 with the gasket, the rotating disc, the pushing plate, and the spring assembled in the housing.

In this embodiment of the regulating valve 100 comprising two outlet holes 15a and 15b, the outlet holes are adjacent and arranged close to an edge of the contact surface 14. Since the pressure that the spring 50 operatively exerts on the gasket 60, and specifically on the closure regions of the gasket 60 formed by the closure members 70a and 70b, is important, the spring 50 is arranged on the pushing plate, as shown in FIG. 8, clipped to the tabs 93, and off-centered with respect to the center of the rotating disc 20 and of the pushing plate 90, such that the axial projection of the spring 50 over the gasket 60 passes, in this embodiment of the regulating valve 100, partially over the bodies 71a and 71b of the corresponding closure members 70a and 70b. Due to the dimension of the regulating valve 100 that is smaller than other valves with a higher number of gas outlet conduits, and to the arrangement of the corresponding outlet holes 15a and 15b on the contact surface 14, one spring 50 is sufficient in this regulating valve 100 to assure sealing, and particularly sealing in the closed position of the regulating valve 100.

FIGS. 10 to 17 show a second embodiment of the regulating valve 100' for a gas cooking appliance according to the invention, comprising a safety valve 30, and two gas outlet conduits 12a and 12b. This regulating valve 100' comprises the same features as the embodiment of the regulating valve 100, with the difference that it comprises, on the contact surface 14 of the housing 13 of the valve body 10, two outlet holes 15a and 15b in fluid communication in a corresponding manner with the two gas outlet conduits 12a and 12b, the outlet holes 15a and 15b in this embodiment being two holes for the main gas flow, and not for the minimum flow specifically with a bypass. The gas outlet conduits 12a and 12b are suitable for conducting the incoming gas to a burner with two caps, in a corresponding manner to an inner cap and an outer cap (not depicted). Gas flow to the outlet conduits 12a and 12b is regulated by overlapping the outlet holes 15a and 15b with a corresponding number of connection openings 21a and 21b of the rotating disc 20.

Figure 14:
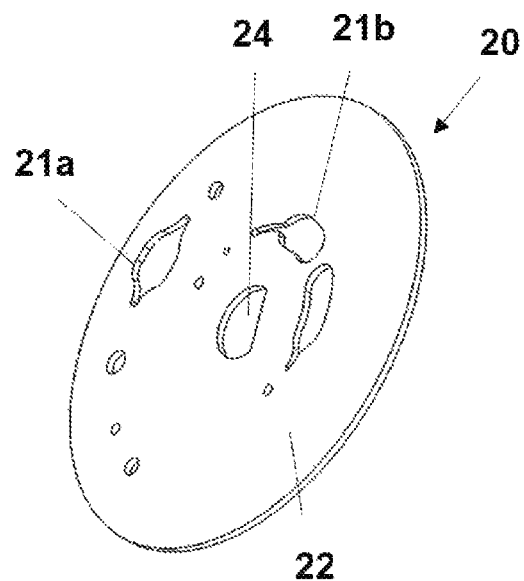
FIG. 14 shows a perspective view of the rotating disc of the regulating valve of FIG. 10.

FIG. 14 shows an embodiment of the rotating disc 20 for the regulating valve 100', comprising two through connection openings 21a and 21b for regulating gas flow from the housing 13 of the valve body 10 to the outlet conduits 12a and 12b depending on the angular position thereof. The through holes of the connection openings 21a and 21b form arcs of different radius, the radius of the opening 21b being smaller than the radius of the opening 21a, such that in order to obtain the required gas flow rate in the gas outlet conduits 12a and 12b, a specific number of holes of the connection openings 21a and 21b of the rotating disc 20 are overlapped with the outlet holes 15a and 15b.

Figure 13:
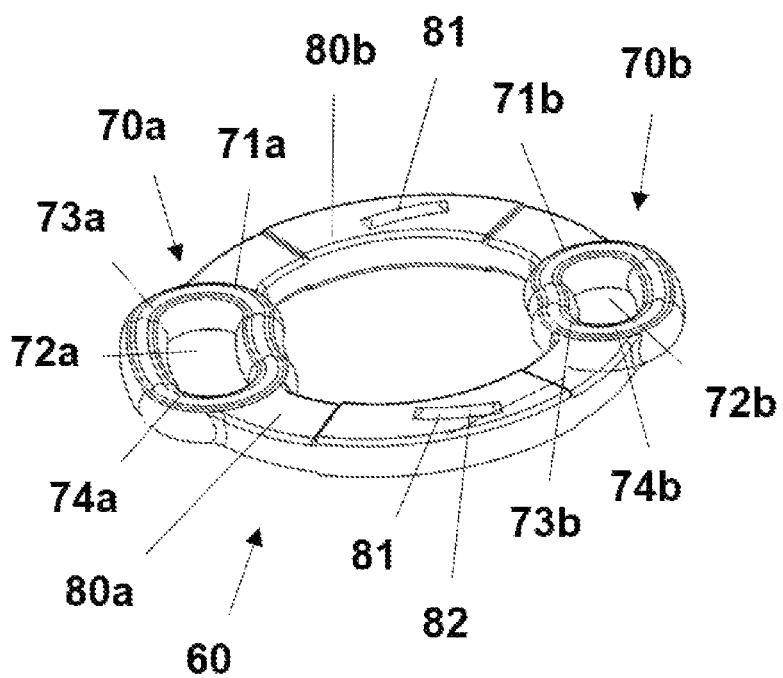
FIG. 13 shows a perspective view of the gasket of the regulating valve of FIG. 10.

The remaining differences of this regulating valve 100' with the previously described embodiment of the regulating valve 100 are that the gasket 60, as shown in FIG. 13, also comprises two closure members 70a and 70b associated respectively with each outlet hole 15a and 15b, but in this embodiment of the regulating valve 100', the outlet holes 15a and 15b are not adjacent, but rather arranged at two ends of the gasket 60 separated by a 180°, the closure members 70a and 70b being close to an edge of the contact surface 14. The gasket 60 also comprises two attachment arms 80a and 80b radially attaching the two closure members 70a and 70b, the two attachment arms 80a and 80b virtually forming a circle, with the two attachment arms 80a and 80b surrounding the center of the gasket 60, such that the gasket 60 is substantially centered on the contact surface 14. In this embodiment, each of the arms 80a and 80b comprises a protuberance 81, such that the rotating disc 20 is supported on the support surface 73a and 73b of the bodies 71a and 71b of the closure members 70a and 70b, respectively, and on the upper region 82 of the protuberances 81, when it is arranged pressing on the gasket 60.

In this embodiment of the regulating valve 100', the attachment arms 80a and 80b extends radially almost to the edge of the contact surface 14 in the housing 13, such that it confers stability to the seating of the gasket 60 in the housing 13 of the valve body 100. The protuberances 81 are arranged on the surface of the attachment arms 80a and 80b which contacts the rotating disc 20, virtually in the center of the surface, the protuberances 81 being distributed in an approximate angle of 180° with respect to one another, with a center in the center of the gasket 60.

For the same reasons as those set forth for the first embodiment of the regulating valve 100, the solution defined in the second embodiment of the regulating valve 100' allows assuring sealing in any position of rotation of the rotating disc 20, and particularly in the closed position of the regulating valve, due to the increase in pressure exerted on the gasket 60 for the same size of spring 50 used as in the prior art, due to the smaller support surface of the rotating disc 20 on the gasket 60.

In turn, the respective body 71a and 71b of the closure members 70a and 70b of the gasket 60 has a substantially circular cross-section, the closure members 70a and 70b being configured as oblong-shaped joints fitting and surrounding the respective outlet holes 15a and 15b. The bodies 71a and 71b comprise a closure protuberance 74a and 74b projecting in the upper part of the joint and running along the contour of the bodies 71a and 71b where the rotating disc 20 is supported. In this manner, like in the protuberances 81, the bodies 71a and 71b define a very small, and therefore lower-friction, contact surface with the face 22 of the rotating disc 20, when the rotating disc 20 rotates as a result of the action of the drive shaft 40, and also when the rotating disc 20 is supported on the bodies 71a and 71b of the closure members 70a and 70b, pressing on the gasket 60. Therefore, the surface offered by the gasket 60 for supporting the rotating disc 20 is defined only by the closure protuberances 74a and 74b and by the upper region 82 of the protuberances 81.

In this embodiment of the regulating valve 100', the bodies 71a and 71b of the closure members 70a and 70b also comprise respective lower protuberances 75a and 75b projecting in the lower part of the joint and running along the contour of the bodies 71a and 71b where the gasket 60 is supported on the contact surface 14. Like the closure protuberances 74a and 74b, the lower protuberances 75a and 75b define a very small contact surface, and therefore the pressure exerted by the gasket 60 on the contact surface 14 is greater, which assures sealing to a larger extent.

Moreover, in this embodiment of the regulating valve 100', the protuberances 81 have a longitudinal axis which is angularly shifted with respect to the longitudinal axis of the respective attachment arms 80a and 80b. The arrangement of the protuberances 81 in the attachment arms 80a and 80b forms part of a virtual circle with a center in the center of rotation of the rotating disc 20, such that when rotating the rotating disc 20 in the contact thereof with the gasket 60, the contact occurs on the protuberances 81 in an area with a smaller contact surface.

The channel 16 on the contact surface 14 comprises two branches or arms in which the attachment arms 80a and 80b are housed, attaching two regions in which the closure members 70a and 70b of the gasket 60 are housed. This housing of the gasket 60 in the channel 16 allows assuring the stability of the gasket 60, given that each attachment arm 80a and 80b is housed in the channel 16 the side walls of which contain and immobilize the gasket 60.

Figure 15:
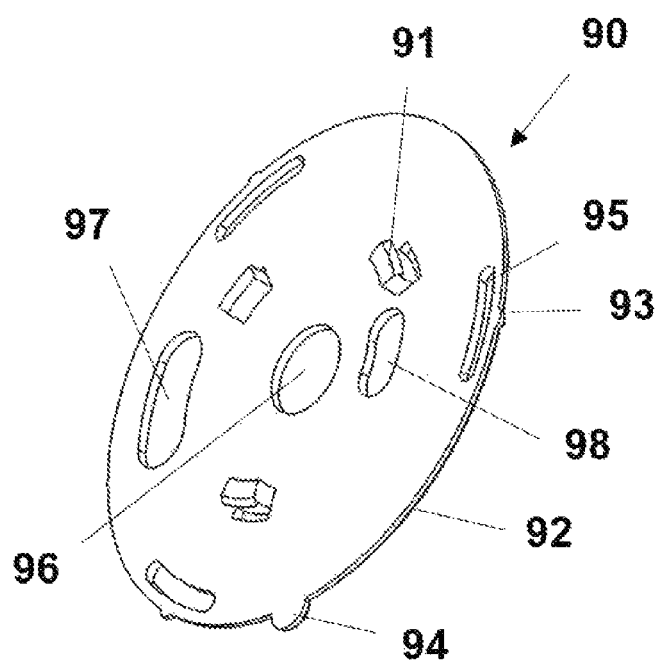
FIG. 15 shows a perspective view of the pushing plate of the regulating valve of FIG. 10.

In this embodiment and as shown in FIG. 15, the regulating valve 100' also comprises a pushing plate 90 which is supported on the rotating disc 20 occupying the entire surface thereof, the end 51 of the spring 50 which pushes the rotating disc 20 being supported on one face of the pushing plate 90, and the other face of the pushing plate 90 being supported on the face 23 of the rotating disc 20.

In this embodiment, the pushing plate 90 also comprises three tabs 91, which allow coupling the end 51 of the spring 50 to the pushing plate 90, clipping to the tabs 91. The tabs 91 are arranged forming a concentric circle with the center of the pushing plate 90. The pushing plate 90 also comprises two through holes 97 and 98 which provide passage, respectively, to the gas flow from the housing 13 to the outlet holes 15a and 15b through the connection openings 21a and 21b, respectively, of the rotating disc 20.

Figure 16:
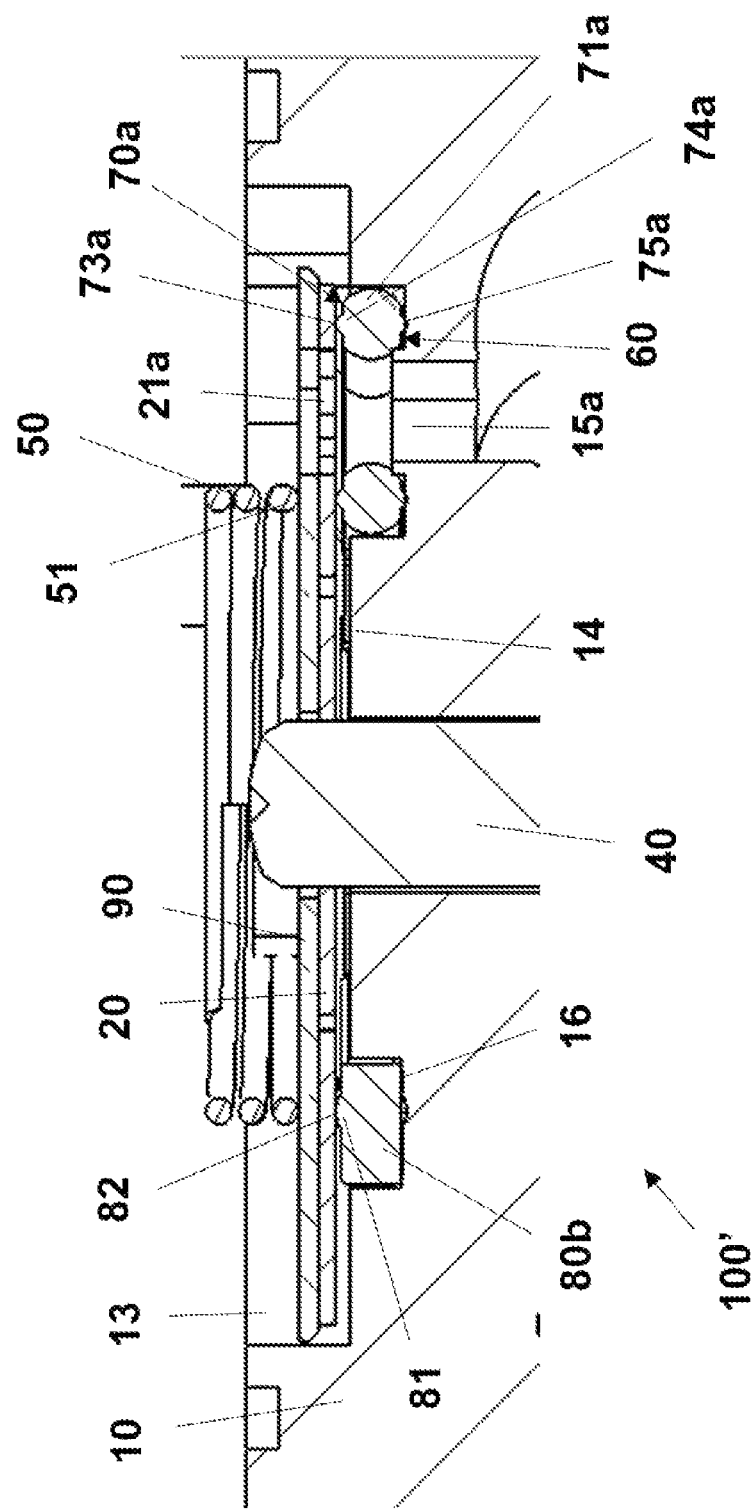
FIG. 16 shows a detailed section view of the housing of the body of the regulating valve of FIG. 10 with the gasket.
Figure 17:
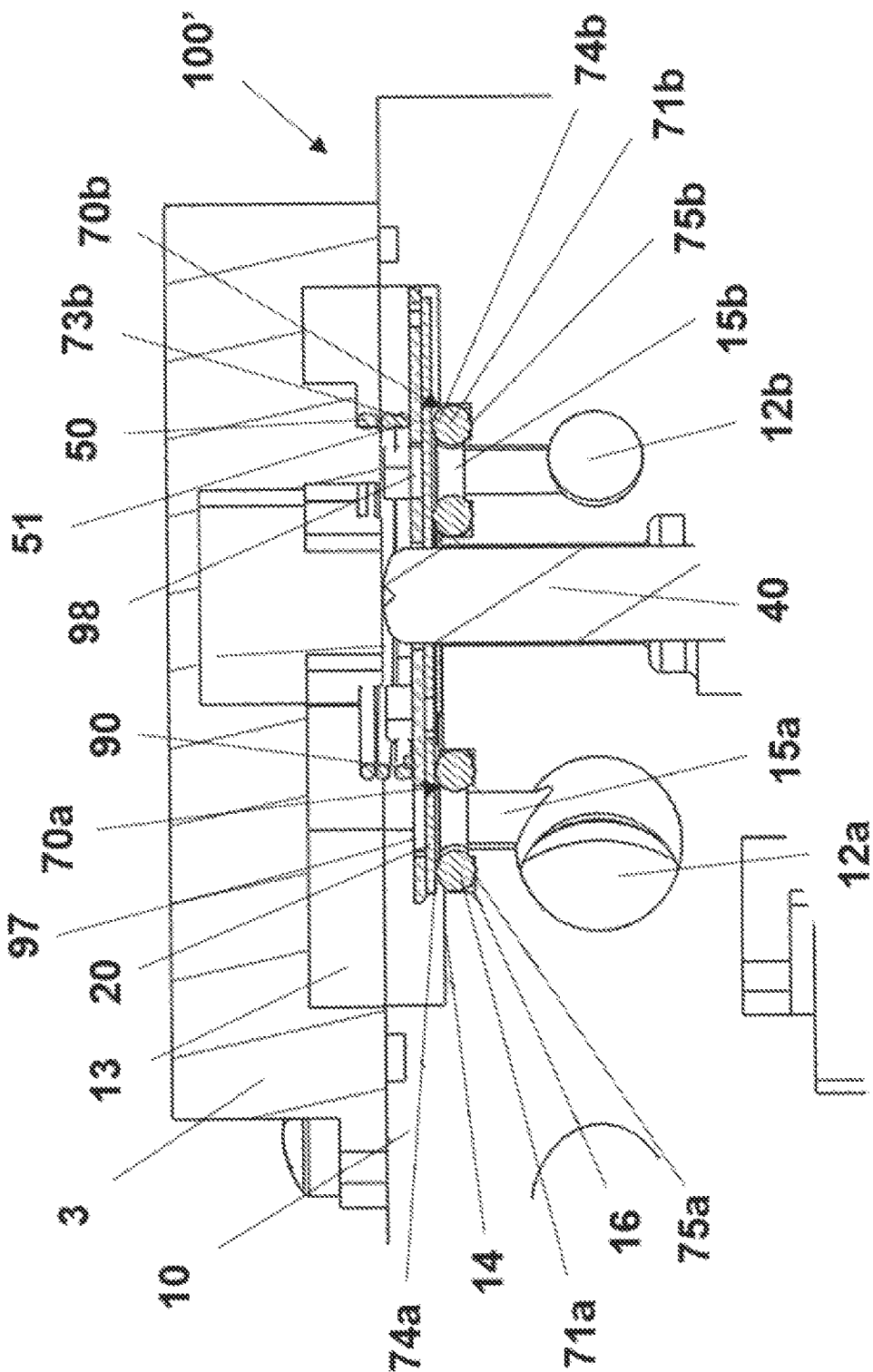
FIG. 17 shows another detailed section view of the housing of the body of the regulating valve of FIG. 10 with the gasket.
Figure 18:
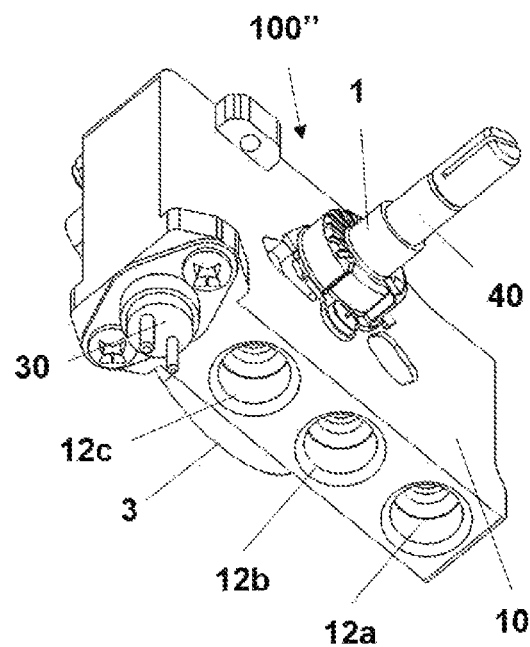
FIG. 18 shows a perspective view of a third embodiment of a regulating valve with a safety valve and three gas outlet conduits.
Figure 19:
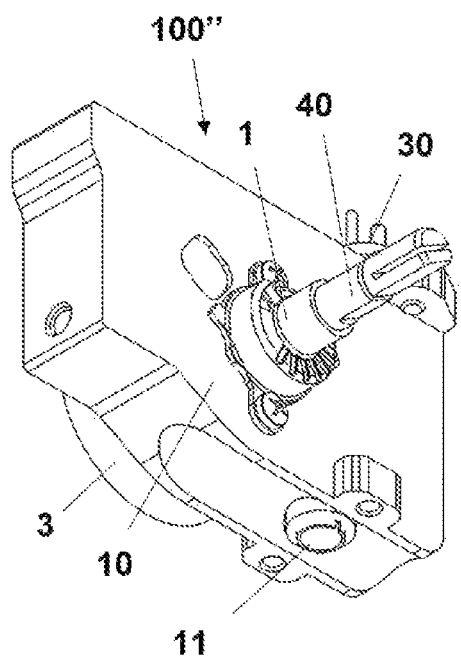
FIG. 19 shows another perspective view of the regulating valve of FIG. 18.
Figure 20:
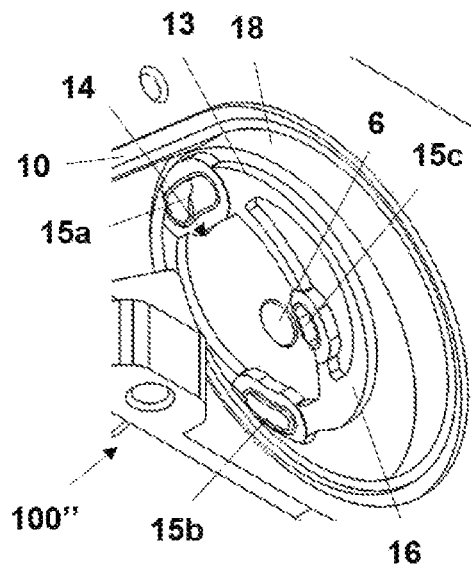
FIG. 20 shows a detailed perspective view of the housing of the body of the regulating valve of FIG. 18.

In this embodiment of the regulating valve 100', the two outlet holes 15a and 15b are not adjacent and arranged with the outlet hole 15a closer to the edge of the contact surface 14 and the outlet hole 15b, in a diameter with the outlet hole 15a on the contact surface 14, between the center of the contact surface 14 and the edge. Since the pressure that the spring 50 operatively exerts on the gasket 60, and specifically on the closure regions of the gasket 60 formed by the closure members 70a and 70b, is important, the spring 50 is arranged on the pushing plate 90, as shown in FIGS. 16 and 17, clipped to the tabs 93, and centered with respect to the center of the rotating disc 20 and of the pushing plate 90, such that the axial projection of the spring 50 over the gasket 60 passes, in this embodiment of the regulating valve 100', through the inner edge of the body 71a and the outer edge of the body 71b of the corresponding closure members 70a and 70b. With this dimension of the regulating valve 100' and with this arrangement of the corresponding outlet holes 15a and 15b on the contact surface 14, one spring 50 is sufficient in this regulating valve 100' to assure sealing, and particularly sealing in the closed position of the regulating valve 100.

FIGS. 18 to 26 show a third embodiment of the regulating valve 100" for a gas cooking appliance according to the invention, comprising a safety valve 30, and three gas outlet conduits 12a, 12b, and 12c. This regulating valve 100" comprises the same features as the embodiment of the regulating valve 100', with the difference that it comprises two springs, a spring 50a and a second spring 50b, which pushes the rotating disc 20 and retain it axially against the contact surface 14. The spring 50a has a larger diameter than the spring 50b. Furthermore, the contact surface 14 of the housing 13 of the valve body 10 comprises three outlet holes 15a, 15b, and 15c in fluid communication in a corresponding manner with the two gas outlet conduits 12a, 12b, and 12c, the outlet holes 15a, 15b, and 15c in this embodiment being three holes for the main gas flow, and not for the minimum flow specifically with a bypass. The gas outlet conduits 12a, 12b, and 12c are suitable for conducting the incoming gas to a burner with three caps, in a corresponding manner to an inner cap, an intermediate cap, and an outer cap (not depicted). Gas flow to the outlet conduits 12a, 12b, and 12c is regulated by overlapping the outlet holes 15a, 15b, and 15c with a corresponding number of connection openings 21a, 21b, 21c of the rotating disc 20.

Figure 22:
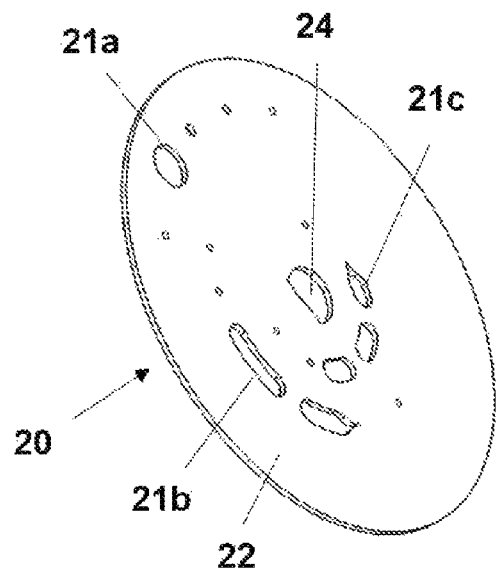
FIG. 22 shows a perspective view of the rotating disc of the regulating valve of FIG. 18.

FIG. 22 shows an embodiment of the rotating disc 20 for the regulating valve 100", comprising three through connection openings 21a, 21b, 21c for regulating gas flow from the housing 13 of the valve body 10 to the outlet conduits 12a, 12b, and 12c depending on the angular position thereof. The through holes of the connection openings 21a, 21b, and 21c each forms a radial-shaped row of different radius, the radius of the opening 21c being smaller than the radius of the opening 21b, and the radius of the opening 21b being smaller than the radius of the opening 21a, such that in order to obtain the required gas flow rate in the gas outlet conduits 12a, 12b, and 12c, a specific number of holes of the connection openings 21a, 21b, and 21c of the rotating disc 20 are overlapped with the outlet holes 15a, 15b, and 15c.

Figure 21:
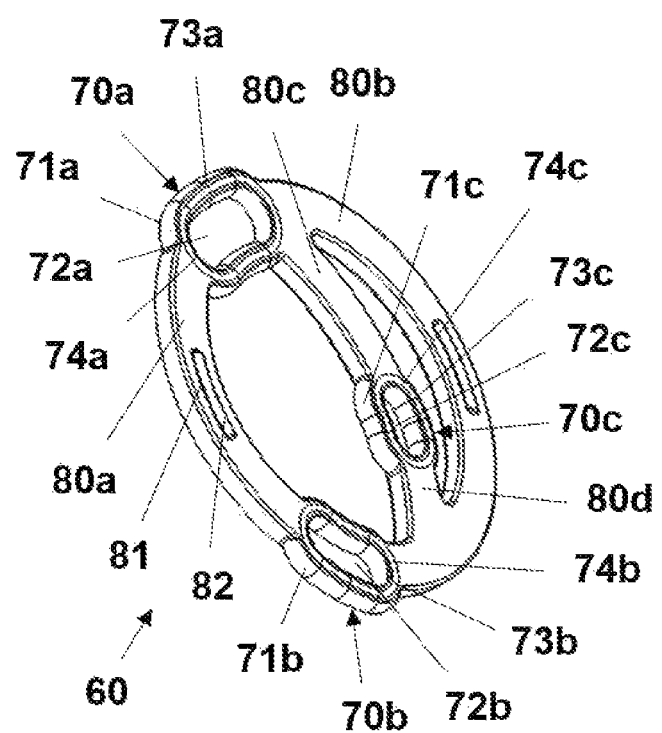
FIG. 21 shows a perspective view of the gasket of the regulating valve of FIG. 18.

The remaining differences of this regulating valve 100" with the previously described embodiment of the regulating valve 100' are that the gasket 60, as shown in FIG. 21, comprises three closure members 70a, 70b, and 70c associated, respectively, with each outlet hole 15a, 15b, and 15c, but in this embodiment of the regulating valve 100" the outlet holes 15a, 15b, and 15c are not arranged at 180°, but rather arranged in approximately a triangle of the gasket 60, with the closure member 70a being close to an edge of the contact surface 14, the closure member 70b in an intermediate region of the contact surface 14, and the closure member 70c close to the hole 6 of the contact surface 14, where the lower end of the drive shaft 14 is housed.

The gasket 60 comprises four attachment arms 80a, 80b, 80c, and 80d, respectively, radially attaching the two closure members 70a and 70b, 70a and 70b in a circular path opposite the preceding one, 70a and 70c, and 70c and 70b, the two attachment arms 80a and 80b virtually forming a circle, the attachment arms 80c and 80d transversely attaching the attachment arm 80b through the closure member 70c, and the four attachment arms 80a, 80b, 80c, and 80d surrounding the center of the gasket 60. In this embodiment, as shown in detailed in FIG. 26, each of the arms 80a and 80b comprises a protuberance 81, such that the rotating disc 20 is supported on the support surface 73a, 73b, and 73c of the bodies 71a, 71b, and 71c of the closure members 70a, 70b, and 70c, respectively, and on the upper region 82 of the protuberances 81, when it is arranged pressing on the gasket 60.

In this embodiment of the regulating valve 100", the circle formed by the attachment arms 80a and 80b are slightly off-centered with respect to the center of the contact surface 14, not covering the entire contact surface 14 in the housing 13, but the opening thereof is wide enough so as to confer stability to the seating of the gasket 60 in the housing 13 of the valve body 10. The protuberances 81 are arranged on the surface of the attachment arms 80a and 80b which contacts the rotating disc 20, virtually in the center of the surface, the protuberances 81 being distributed in an approximate angle of 180° with respect to one another, with a center in the center of the gasket 60.

For the same reasons as those set forth for the first and second embodiments of the regulating valve 100 and 100', the solution defined in the third embodiment of the regulating valve 100" allows assuring sealing in any position of rotation of the rotating disc 20, and particularly in the closed position of the regulating valve, due to the increase in pressure exerted on the gasket 60 for the same size of spring 50 used as in the prior art, due to the smaller support surface of the rotating disc 20 on the gasket 60.

In turn, the respective body 71a, 71b, and 71c of the closure members 70a, 70b, and 70c of the gasket 60 has, like in the gasket 60 of the second embodiment of the regulating valve 100', a substantially circular cross-section, the closure members 70a, 70b, and 70c being configured as oblong-shaped joints fitting and surrounding the respective outlet holes 15a, 15b, and 15c. The bodies 71a, 71b, and 71c comprise, as shown in detailed in FIG. 26, a closure protuberance 74a, 74b, and 74c projecting in the upper part of the joint, and running along the contour of the bodies 71a, 71b, and 71c where the rotating disc 20 is supported. In this manner, like in the protuberances 81, the bodies 71a, 71b, and 71c define a very small, and therefore lower-friction, contact surface with the face 22 of the rotating disc 20, when the rotating disc 20 rotates as a result of the action of the drive shaft 40, and also when the rotating disc 20 is supported on the bodies 71a, 71b, and 71c of the closure members 70a, 70b, and 70c, pressing on the gasket 60. Therefore, the surface offered by the gasket 60 for supporting the rotating disc 20 is defined only by the closure protuberances 74a, 74b, and 74c and by the upper region 82 of the protuberances 81.

In this embodiment of the regulating valve 100', the bodies 71a, 71b, and 71c of the closure members 70a, 70b, and 70c also comprise respective lower protuberances 75a, 75b, and 75c projecting in the lower part of the joint, and running along the contour of the bodies 71a, 71b, and 71c where the gasket 60 is supported on the contact surface 14. Like the closure protuberances 74a, 74b, and 74c, the lower protuberances 75a, 75b, and 75c define a very small contact surface, and therefore the pressure exerted by the gasket 60 on the contact surface 14 is greater, which assures sealing to a larger extent.

Figure 26:
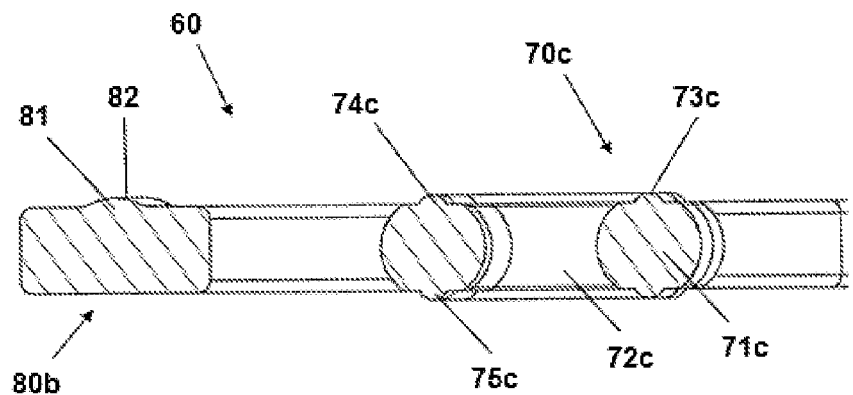
FIG. 26 shows a detailed section view of the gasket of the regulating valve of FIG. 18 with a protuberance of the attachment arm and the closure protuberance and the lower protuberance of the body of a closure member.

FIG. 26 also shows in detailed how the protuberance 81 of the gasket 60 of the regulating valves 100 and 100' is, and how the closure protuberances 74a and 74b and the lower protuberances 75a and 75b of the body 71a and 71 b of the respective closure members 70a and 70b of the regulating valve 100' are.

Moreover, in this embodiment of the regulating valve 100', like in the first embodiment of the regulating valve 100, the protuberances 81 have a longitudinal axis which is aligned with the longitudinal axis of the attachment arms 80a and 80b incorporating same.

The channel 16 on the contact surface 14 comprises as many branches or arms as the number of attachment arms, attaching three regions in which the closure members 70a, 70b, and 70c of the gasket 60 are housed. This housing of the gasket 60 in the channel 16 allows assuring the stability of the gasket 60, given that each attachment arm 80a, 80b, 80c, and 80d is housed in the channel 16 the side walls of which contain and immobilize the gasket 60.

Figure 23:
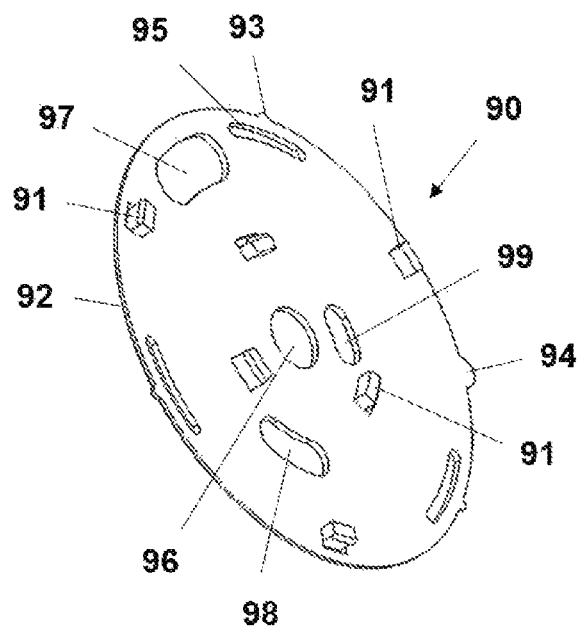
FIG. 23 shows a perspective view of the pushing plate of the regulating valve of FIG. 18.
Figure 24:
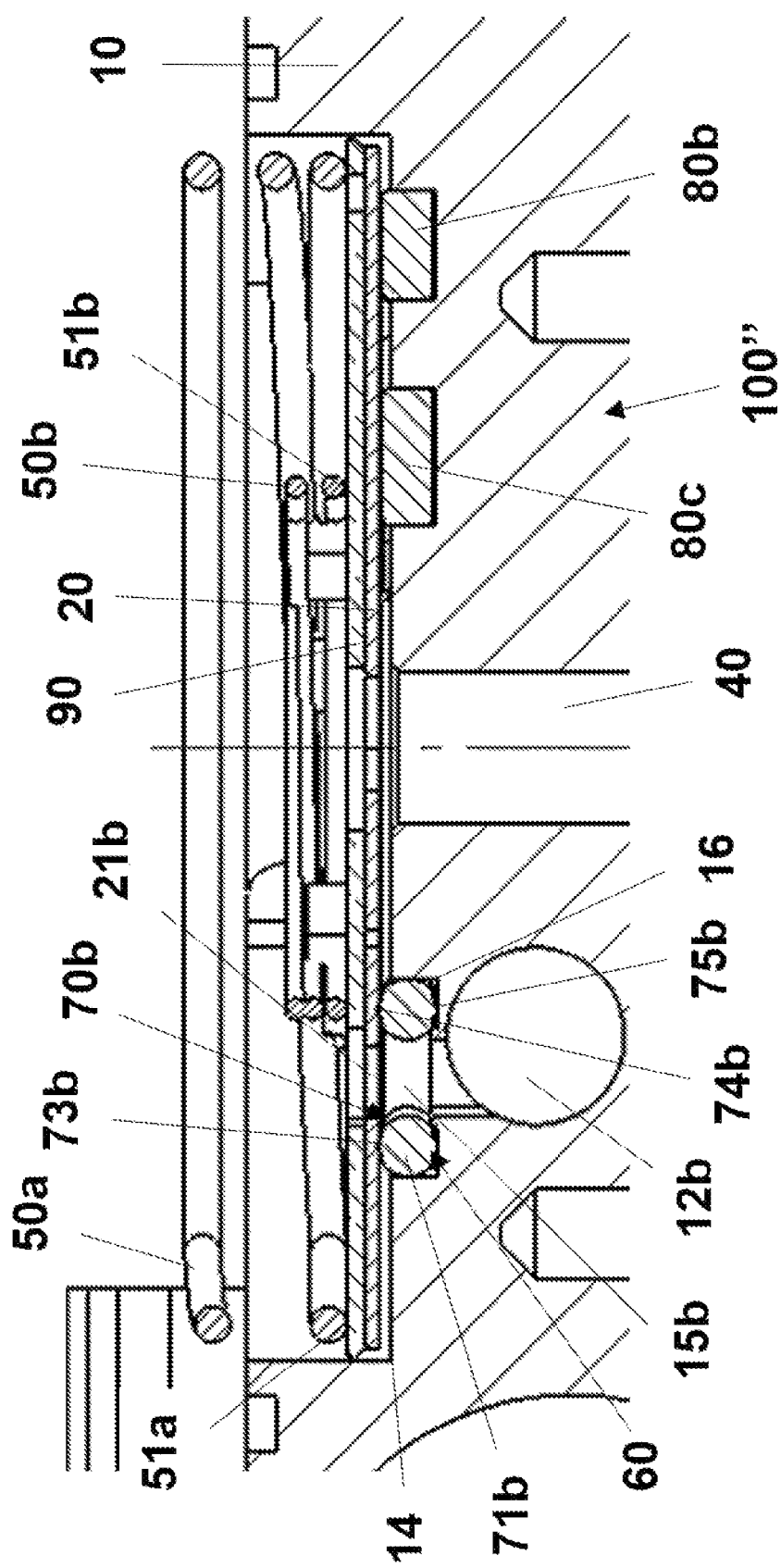
FIG. 24 shows a detailed section view of the housing of the body of the regulating valve of FIG. 18 with the gasket.
Figure 25:
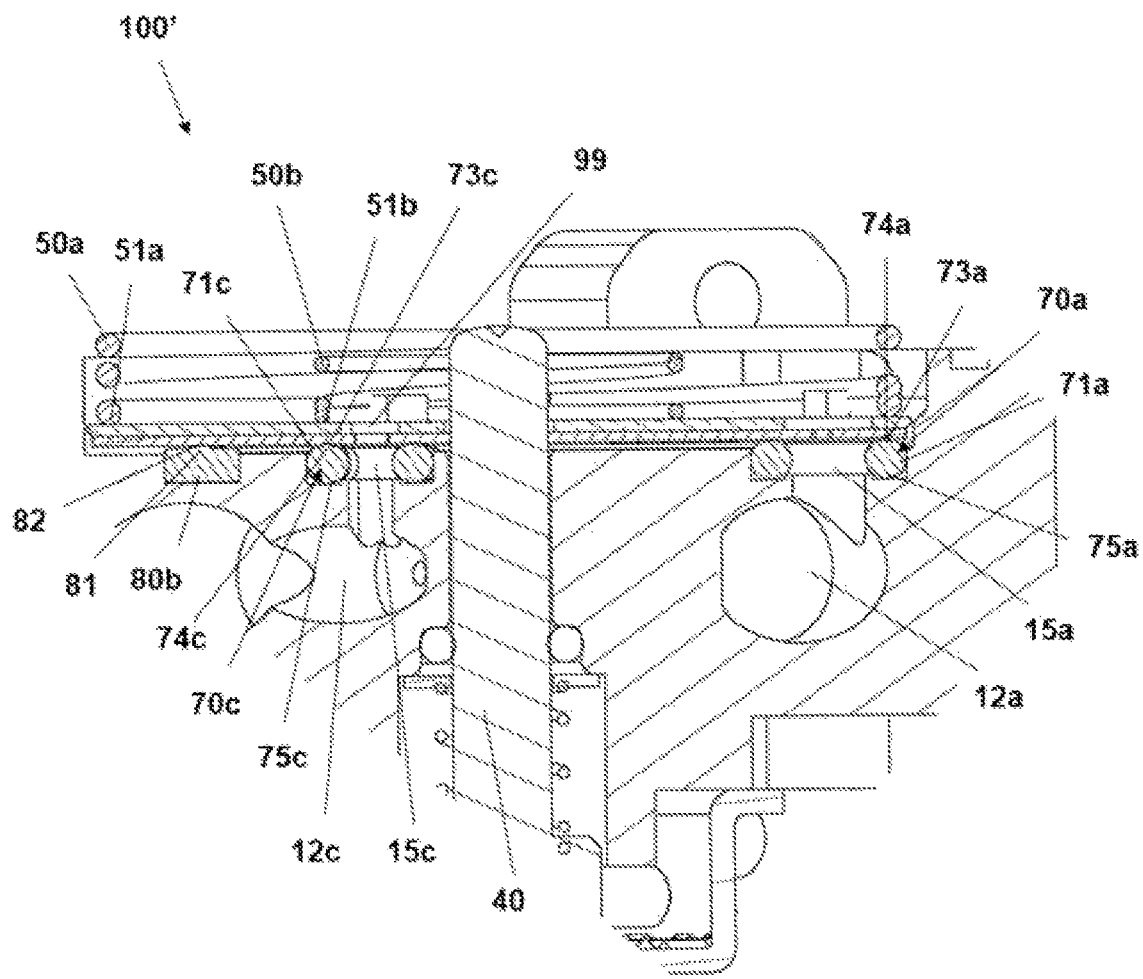
FIG. 25 shows another detailed section view of the housing of the body of the regulating valve of FIG. 18 with the gasket.

In this embodiment and as shown in FIG. 23, the regulating valve 100" also comprises a pushing plate 90 which is supported on the rotating disc 20 occupying the entire surface thereof, the ends 51a and 51b of the springs 50a and 50b pushing the rotating disc 20 being supported on one face of the pushing plate 90, and the other face of the pushing plate 90 being supported on the face 23 of the rotating disc 20.

In this embodiment, the pushing plate 90 comprises six tabs 91 arranged on the face on which the springs 50a and 50b are coupled, three of them being distributed in an outer circle and three of them distributed in an inner circle which allow coupling the ends 51a and 51b, respectively, of the springs 50a and 50b to the pushing plate 90, being clipped to the tabs 91. The tabs 91 are arranged forming concentric circles with the center of the pushing plate 90. The pushing plate 90 comprises three through holes 97, 98, and 99 which provide passage, respectively, to the gas flow from the housing 13 to the outlet holes 15a, 15b, and 15c through the connection openings 21a, 21b, and 21c, respectively, of the rotating disc 20.

In this embodiment of the regulating valve 100", the three outlet holes 15a, 15b, and 15c are not adjacent and arranged with the outlet hole 15a closer to the edge of the contact surface 14, the outlet hole 15b in a central position on the contact surface 14, and the outlet hole 15c closer to the center of the contact surface 14, in the housing 6 of the lower end of the drive shaft 40, the three outlet holes 15a, 15b, and 15c forming a triangle. Since the pressure that the springs 50a and 50b operatively exert on the gasket 60, and specifically on the closure regions of the gasket 60 formed by the closure members 70a, 70b, and 70c, is important, the springs 50a and 50b are arranged on the pushing plate 90, as shown in FIGS. 16 and 17, clipped to the tabs 93, and centered with respect to the center of the rotating disc 20 and of the pushing plate 90, such that the axial projection of the springs 50a and 50b on the gasket 60 passes, in this embodiment of the regulating valve 100", the spring 50a by the outer edge of the body 71a, and the second spring 50b by the inner edge of the body 71b and by the inner edge of the body 71c, of the respective closure members 70a, 70b, and 70c. This embodiment of the regulating valve 100" has a greater dimension than the first and second embodiments of the regulating valve 100 and 100', and furthermore taking into account such an open arrangement of the corresponding outlet holes 15a, 15b, and 15c on the contact surface 14, a single spring in this regulating valve 100" is not sufficient to make compression on the closure surface of the gasket 60 uniform, and thereby assure sealing, and particularly sealing in the closed position of the regulating valve 100", so two springs 50a and 50b with the characteristics defined above are arranged.

Figure 27:
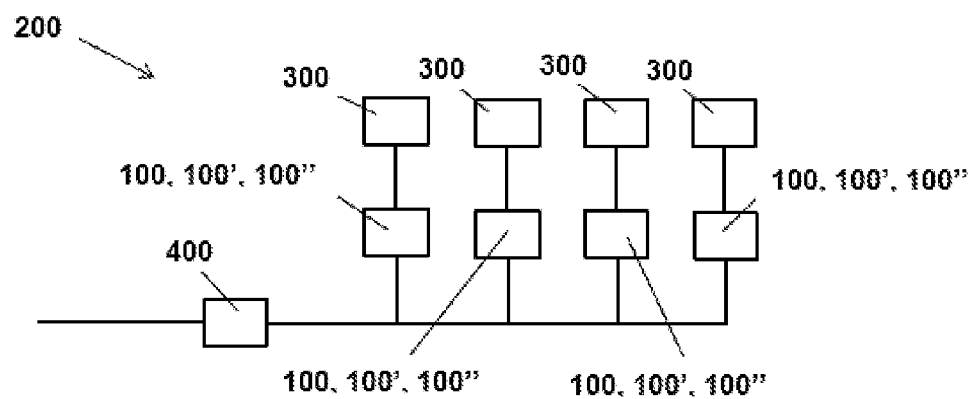
FIG. 27 shows a schematic view of an embodiment of a gas cooking appliance.

The invention also relates to a gas cooking appliance 200 incorporating at least one regulating valve 100, 100', 100". FIG. 27 shows, in an illustrative manner, a schematic depiction of an embodiment of a gas cooking appliance 200 of the invention with four burners 300, each with its respective regulating valve 100, 100', 100". The gas cooking appliance 200 of FIG. 26 also comprises an ON-OFF shut-off valve 400 at the gas supply inlet. Although the regulating valves 100, 100', 100" are manually operated in this embodiment, in other embodiments not shown in the drawings, the regulating valves 100, 100', 100" can be controlled by a control device, or both by a control device and manually.

The gas cooking appliance 200 can be, for example, a gas cooktop, a gas cooker, a gas oven, or a grill.

The following clauses disclose additional embodiments.

Clause 1. A regulating valve for a gas cooking appliance, comprising a valve body 10 comprising an inlet conduit 11 through which gas is supplied, at least one gas outlet conduit 12, and a housing 13 in fluid communication with the inlet conduit 11 and the outlet conduit 12; a rotating disc 20 arranged in the housing 13 of the valve body 10 on a contact surface 14 of the housing 13, the contact surface 14 comprising at least one outlet hole 15 in fluid communication with the outlet conduit 12, the rotating disc 20 being suitable for rotating with respect to the contact surface 14 and for regulating gas flow between the housing 13 and the outlet conduit 12 by means of the rotation of the rotating disc 20; a spring 50 which pushes the rotating disc 20 and retains it axially against the contact surface 14; and sealing means housed on the contact surface 14 surrounding the at least one outlet hole 15, the rotating disc 20 being supported pressing on the sealing means, the sealing means comprise a gasket 60 comprising a closure member 70 associated with each outlet hole 15, each closure member 70 comprising a body 71 surrounding the corresponding outlet hole 15, and at least one attachment arm 80 attached to the at least one closure member 70, the at least one attachment arm 80 comprising at least one protuberance 81, with the rotating disc 20 being supported on the closure members 70 and on the protuberances 81 when it presses on the gasket 60.

Clause 2. The regulating valve according to clause 1, wherein the protuberance 81 projects from the attachment arm 80 defining a curved outer surface.

Clause 3. The regulating valve according to clause 1 or 2, wherein the attachment arm 80 has a quadrangular-shaped cross-section.

Clause 4. The regulating valve according to any of clauses 1 to 3, wherein the protuberance 81 has a longitudinal axis angularly shifted with respect to the longitudinal axis of the attachment arm 80, the protuberance 81 preferably forming part of a virtual circle with a center in the center of rotation of the rotating disc 20.

Clause 5. The regulating valve according to any of clauses 1 to 4, wherein the body 71 of the closure member 70 of the gasket 60 has a circular cross-section.

Clause 6. The regulating valve according to any of clauses 1 to 5, wherein the body 71 comprises a closure protuberance 74 running along the contour of the body 71 where the rotating disc 20 is supported.

Clause 7. The regulating valve according to clause 6, wherein the body 71 of the closure member 70 comprises a lower protuberance 75 running along the contour of the body 71 where the gasket 60 is supported on the contact surface 14.

Clause 8. The regulating valve according to any of clauses 1 to 7, wherein the at least one attachment arm 80 attaches said at least one closure member 70 surrounding the center of rotation of the rotating disc 20.

Clause 9. The regulating valve according to any of clauses 1 to 8, wherein the contact surface 14 of the housing 13 of the body 10 comprises a planar support surface comprising a channel 16, with the gasket 60 being housed in said channel 16.

Clause 10. The regulating valve according to clause 9, comprising a bushing 17 arranged such that it is introduced in the outlet hole 15, with a segment of said bushing 17 projecting from the outlet hole 15, the body 71 of the closure member 70 being housed in the channel 16 laterally abutting the wall of the channel 16 and the segment of the bushing 17.

Clause 11. The regulating valve according to any of clauses 1 to 10, comprising a pushing plate 90 which is supported on the rotating disc 20, an end 51 of the spring 50 which pushes the rotating disc 20 being supported on the pushing plate 90, the pushing plate 90 comprising a plurality of tabs 91 which allow coupling the end 51 of the spring 50 to the pushing plate 90.

Clause 12. The regulating valve according to clause 11, wherein the pushing plate 90 comprises along the perimeter of an edge 92 a plurality of fixing protrusions 93 and an orienting protrusion 94, the housing 13 of the body 10 comprising a side wall 18 bordering the contact surface 14, said wall 18 comprising a housing 19, the orienting protrusion 94 being housed in the housing 19, and the protrusions 93 being arranged pressing on the side wall 18 when the pushing plate 90 is supported on the rotating disc 20.

Clause 13. The regulating valve according to clause 12, wherein the pushing plate 90 comprises a plurality of openings 95 arranged inside the pushing plate 90 confronted in association with each of the protrusions 93.

Clause 14. The regulating valve according to any of clauses 1 to 13, wherein if there is an outlet hole 15 the axial projection of the spring 50 over the gasket 60 partially passes over the body 71 of the corresponding closure member 70, if there are two outlet holes 15 the axial projection of the spring 50 over the gasket 60 partially passes over the body 71 of the two corresponding closure members 70, and if there are three outlet holes 15 the axial projection of the spring 50 over the gasket 60 partially passes over the body 71 of two of the closure members 70, the regulating valve 100 comprising a second spring 50 partially passing over the body 71 of the third closure member 70.

Clause 15. A gas cooking appliance comprising at least one regulating valve 100, 100', 100" according to any of the preceding clauses.

What is claimed is:

1. A regulating valve for a gas cooking appliance comprising:
   a valve body including a gas inlet conduit through which gas is supplied, a first gas outlet conduit, and a housing in fluid communicated with the gas inlet conduit and the first gas outlet conduit;
   a rotating disc arranged in the housing of the valve body facing a surface that at least partially defines the housing, the surface including a first outlet hole in fluid communication with the first gas outlet conduit, the rotating disc being rotatable with respect to the surface and configured to regulate a gas flow between the housing and the first gas outlet conduit by means of rotating the rotating disc; and
   a gasket on the surface surrounding the first outlet hole, the rotating disc being supported pressing on the gasket, the gasket including a first closure member associated with the first outlet hole, the first closure member including a first body surrounding the first outlet hole, the gasket including a first attachment arm having a first end attached to a first part of the first body, the first attachment arm including a first protuberance, a first face of the rotating disc being supported on the first closure member and on the first protuberance when the rotating disc is supported pressing on the gasket.

2. The regulating valve according to claim 1, wherein the first attachment arm has a second end attached to a second part of the first body.

3. The regulating valve according to claim 1, wherein the valve body includes a second gas outlet conduit, the surface that at least partially defines the housing including a second outlet hole in fluid communication with the second gas outlet conduit, the rotating disc being rotatable with respect to the surface and configured to regulate the gas flow between the housing and the first and second gas outlet conduits by means of rotating the rotating disc, the gasket being on the surface surrounding the second outlet hole, the rotating disc being supported pressing on the gasket, the gasket including a second closure member associated with the second outlet hole, the second closure member including a second body surrounding the second outlet hole, the first attachment arm having a second end attached to a first part of the second body of the second closure member.

4. The regulating valve according to claim 3, further comprising a second attachment arm having a first end attached to a second part of the first body of the first closure member and a second end attached to a second part of the second body of the second closure member, the second attachment arm including a second protuberance, the first face of the rotating disc being supported on the first and second closure members and on the first and second protuberances when the rotating disc is supported pressing on the gasket.

5. The regulating valve according to claim 1, further comprising a spring acting on the rotating disc to cause the rotating disc to be supported pressing on the gasket.

6. The regulating valve according to claim 5, further comprising a pushing plate that presses against a second face of the rotating disc, the second face of the rotating disc being opposite the first face of the rotating disc, an end of the spring being coupled to the pushing plate.

7. The regulating valve according to claim 6, wherein pushing plate includes a plurality of tabs to which the end of the spring is coupled.

8. The regulating valve according to claim 6, wherein the pushing plate includes a plurality of fixing protrusions located along a perimeter of an edge of the pushing plate, the housing of the valve body comprising a side wall bordering the surface that at least partially defines the housing, the plurality of protrusions being arranged resting on the side wall.

9. The regulating valve according to claim 8, wherein the pushing plate further includes an orienting protrusion that resides in an opening in the sidewall of the housing of the valve body.

10. The regulating valve according to claim 8, wherein the pushing plate further comprises a plurality of through openings extending between first and second opposite sides of the pushing plate, each one of the plurality of through openings being radially aligned with a respective one of the plurality of fixing protrusions.

11. The regulating valve according to claim 5, wherein an axial projection of the spring over the gasket partially passes over the first body of the first closure member.

12. The regulating valve according to claim 1, wherein the first protuberance has a curved outer surface.

13. The regulating valve according to claim 1, wherein the first protuberance forms a part of a virtual circle that has a center located in a center of rotation of the rotating disc.

14. The regulating valve according to claim 1, wherein the first body of the first closure member comprises a first closure protuberance projecting from and running along an upper part of the first body, the first face of the rotating disc being supported on the first closure protuberance.

15. The regulating valve according to claim 14, wherein the first body of the first closure member comprises a first lower protuberance projecting from and running along a lower part of the first body where the gasket is supported on the surface that at least partially defines the housing of the valve body.

16. The regulating valve according to claim 1, wherein the first attachment arm surrounds a center of rotation of the rotating disc.

17. The regulating valve according to claim 16, further comprising a bushing arranged at least partially residing in the first outlet hole with a segment of the bushing projecting from the first outlet hole, the first body of the first closure member being housed in the channel and laterally abutting a wall of the channel and the segment of the bushing.

18. The regulating valve according to claim 1, wherein the surface that at least partially defines the housing of the valve body comprises a planar support surface having a channel formed therein, the gasket being at least partially housed in the channel.

19. The regulating valve according to claim 1, wherein the surface that at least partially defines the housing of the valve body includes a second outlet hole in fluid communication with the first gas outlet conduit, the gasket surrounding the second outlet hole, the gasket including a second closure member associated with the second outlet hole, the second closure member including a second body surrounding the second outlet hole, the gasket including a second attachment arm having a first end attached to a first part of the second body and a second end attached to a second part of the second body, the second attachment arm including a second protuberance, the first face of the rotating disc being supported on the second closure member and on the second protuberance when the rotating disc is supported pressing on the gasket.

20. The regulating valve according to claim 19, wherein the regulating valve includes a drive shaft, one of the first and second attachment arms surrounding the drive shaft.

\* \* \* \* \*